(12) United States Patent
Nakao et al.

(10) Patent No.: US 7,243,020 B2
(45) Date of Patent: Jul. 10, 2007

(54) KNOCK DETECTION APPARATUS AND KNOCK DETECTION METHOD

(75) Inventors: Takao Nakao, Hyogo (JP); Hirofumi Taguchi, Hyogo (JP); Hiroshi Arita, Hyogo (JP); Takahiro Aki, Hyogo (JP)

(73) Assignee: Fujitsu Ten Limited, Kobe-shi (JP)

( * ) Notice: Subject to any disclaimer, the term of this patent is extended or adjusted under 35 U.S.C. 154(b) by 0 days.

(21) Appl. No.: 11/292,077

(22) Filed: Dec. 2, 2005

(65) Prior Publication Data

US 2006/0122765 A1    Jun. 8, 2006

(30) Foreign Application Priority Data

| Dec. 3, 2004 | (JP) | ............................. 2004-351951 |
| Feb. 14, 2005 | (JP) | ............................. 2005-036108 |
| Nov. 2, 2005 | (JP) | ............................. 2005-319758 |

(51) Int. Cl.
*F02P 5/152* (2006.01)
*G01L 23/22* (2006.01)

(52) U.S. Cl. ................... 701/111; 123/406.37; 73/118.1

(58) Field of Classification Search ................ 701/111, 701/113, 114; 73/118.1, 117.1, 35.04, 35.05, 73/35.09, 35.08; 123/435, 436, 406.34, 406.35, 123/406.29, 406.37
See application file for complete search history.

(56) References Cited

U.S. PATENT DOCUMENTS 5,140,962 A    8/1992 Iwata ..................... 123/406.35

6,185,984 B1    2/2001  Takahashi ................... 73/35.08
6,880,381 B2*  4/2005  Fukuoka et al. ........... 73/35.04
6,932,056 B1*  8/2005  Tartt ....................... 123/406.37

FOREIGN PATENT DOCUMENTS

| JP | 03-145551 | 6/1991 |
| JP | 05-010236 | 1/1993 |
| JP | 05-010237 | 1/1993 |
| JP | 08-218996 | 8/1996 |
| JP | 10-184514 | 7/1998 |
| JP | 2001-082309 | 3/2001 |

* cited by examiner

*Primary Examiner*—Willis R. Wolfe
*Assistant Examiner*—Johnny H. Hoang
(74) *Attorney, Agent, or Firm*—Oliff & Berridge, PLC

(57) ABSTRACT

A knock detection apparatus which is capable of changing a knock control starting time period appropriately so as to prevent erroneous knock determination, to thereby expand a knock control range. A peak value acquisition unit acquires a peak value of a vibration of an internal combustion engine during each rotation cycle of a crankshaft of the engine. A background calculator calculates a background by averaging peak values acquired by the peak value acquisition unit. A knock determination unit performs knock determination based on whether a peak value acquired by the peak value acquisition unit is higher than a predetermined level above the background, and feedback controls knock in the engine according to a result of the knock determination. A temperature acquisition unit acquires a temperature of the engine during a start of the engine. A knock determination controller inhibits operation of the knock determination unit until a predetermined time period determined according to the engine temperature acquired by the temperature acquisition unit has elapsed.

26 Claims, 34 Drawing Sheets

FIG. 5

41 COOLANT TEMPERATURE TABLE

| COOLANT TEMPERATURE(°C) | -30 | -10 | 10 | 30 | 50 | 70 | 90 | 110 |
|---|---|---|---|---|---|---|---|---|
| START-INHIBITING TIME PERIOD(SEC.) | 17.4 | 14.3 | 5.1 | 3.1 | 3.1 | 3.1 | 3.1 | 3.1 |

42 OIL TEMPERATURE TABLE

| OIL TEMPERATURE(°C) | -30 | -10 | 10 | 30 | 50 | 70 | 90 | 110 |
|---|---|---|---|---|---|---|---|---|
| START-INHIBITING TIME PERIOD(SEC.) | 5.8 | 4.8 | 1.7 | 1.0 | 1.0 | 1.0 | 1.0 | 1.0 |

FIG. 6

43 INTAKE AIR TEMPERATURE TABLE

| INTAKE AIR TEMERATURE(°C) | -30 | -10 | 10 | 30 | 50 | 70 | 90 | 110 |
|---|---|---|---|---|---|---|---|---|
| START-INHIBITING TIME PERIOD(SEC.) | 11.6 | 9.6 | 3.4 | 2.0 | 2.0 | 2.0 | 2.0 | 2.0 |

FIG. 7

| 141 COOLANT TEMPERATURE-BASED LEARNING TABLE | | | | |
|---|---|---|---|---|
| COOLANT TEMPERATURE-BASED LEARNED VALUE [A1] | COOLANT TEMPERATURE-BASED LEARNED VALUE [A2] | COOLANT TEMPERATURE-BASED LEARNED VALUE [A3] | COOLANT TEMPERATURE-BASED LEARNED VALUE [A4] | COOLANT TEMPERATURE-BASED LEARNED VALUE [A5] |
| 0°C | 30°C | 60°C | 90°C | |

142 INTAKE AIR TEMPERATURE-BASED LEARNING TABLE

| INTAKE AIR TEMPERATURE-BASED LEARNED VALUE [A1] | INTAKE AIR TEMPERATURE-BASED LEARNED VALUE [A2] | INTAKE AIR TEMPERATURE-BASED LEARNED VALUE [A3] | INTAKE AIR TEMPERATURE-BASED LEARNED VALUE [A4] | INTAKE AIR TEMPERATURE-BASED LEARNED VALUE [A5] |
|---|---|---|---|---|
| 0°C | 30°C | 60°C | 90°C | |

143 OIL TEMPERATURE-BASED LEARNING TABLE

| OIL TEMPERATURE-BASED LEARNED VALUE [A1] | OIL TEMPERATURE-BASED LEARNED VALUE [A2] | OIL TEMPERATURE-BASED LEARNED VALUE [A3] | OIL TEMPERATURE-BASED LEARNED VALUE [A4] | OIL TEMPERATURE-BASED LEARNED VALUE [A5] |
|---|---|---|---|---|
| 0°C | 30°C | 60°C | 90°C | |

FIG. 27

KNOCK DETECTION APPARATUS AND KNOCK DETECTION METHOD

CROSS-REFERENCE TO RELATED APPLICATIONS

This application is based upon and claims the benefits of priority from the prior Japanese Patent Application Nos. 2004-351951 filed Dec. 3, 2004, 2005-36108 filed Feb. 14, 2005, and 2005-319758 filed Nov. 2, 2005, the entire contents of which are incorporated herein by reference.

BACKGROUND OF THE INVENTION

1. Field of the Invention

This invention relates to a knock detection apparatus, and more particularly to a knock detection apparatus for calculating a threshold value for knock determination based on a detected knock signal from an internal combustion engine.

2. Description of the Related Art

There has been proposed a knock control method in which knock having occurred in an engine is detected, and ignition timing is controlled based on a detected knock condition (see e.g. Japanese Unexamined Patent Publication No. 08-218996). In this knock control method, only a frequency component which can contain vibration caused by engine knock is obtained by filtering an output from a knock sensor using a band pass filter (BPF), and a peak value of the frequency component is sampled whenever the TDC (top dead center) position of each cylinder is reached. Then, the sampled peak value is compared with an averaged value (hereinafter referred to as "background") of peak values sampled so far, and whether or not knock has occurred is determined based on whether the currently sampled peak value is higher than a predetermined level above the background, whereby the amount of ignition advance is feedback-controlled. The feedback control is performed such that if it is determined that knock has not occurred, ignition timing is progressively advanced, whereas if it is determined that knock has occurred, ignition timing is retarded.

By the way, the background is obtained by averaging sampled peak values as mentioned above. More specifically, a value obtained by subtracting the immediately preceding background from the current peak value is multiplied by a predetermined coefficient, and a value obtained by the multiplication is added to the immediately preceding background to thereby determine the current background, this value (updated value) being provided with an update guard value for preventing a sudden change of the background due to noise. Therefore, it takes time for the background to converge to a constant value at which the engine is started.

FIG. 34 is a diagram useful in explaining the convergence of background during the start of the engine. As shown in FIG. 34, sampling of peak values is started upon the start of the engine. However, since the background is obtained by averaging sampled peak values, it is updated whenever the TDC position of each cylinder is reached, whereby the background is caused to progressively converge to a peak value. For this reason, if knock determination is performed before the background has converged to the peak value (i.e. during a period F in FIG. 34), it can be determined that the peak value is higher than the predetermined level above the background without occurrence of knock, which causes erroneous determination that knock has occurred. To prevent this erroneous determination, it is a conventional practice to start the knock feedback control after the lapse of a predetermined time period, by taking a time period required for convergence of the background into consideration.

Further, although in the calculation of the background, the update guard value for preventing a sudden change of the background due to noise is provided as mentioned hereinabove, if a sudden change of the peak value is caused not by noise, but by a correct cause, the update guard value retards convergence of the background. To eliminate this inconvenience, it is conventional to change the update guard value according to engine speed and intake pipe pressure so as to prevent retardation of convergence of the background. For example, when engine speed or intake pipe pressure rises suddenly, the absolute value of the peak value also increases suddenly. In this case, since the change in the peak value is not due to noise, the update guard value is increased so as to enable the background to quickly converge to the peak value. This causes the background to converge to a predetermined value.

As described above, in the prior art, even when the background has actually converged to a peak value, knock feedback control is started after the lapse of a predetermined time period, resulting in a narrowed knock control range.

Further, at the start of the engine, it takes time for the background (threshold value) to converge, inhibiting knock determination from being performed before the background has converged.

Furthermore, in the prior art, the update guard value (upper limit value) is changed only based on engine speed and intake pipe pressure, but not changed even when the peak value has changed due to other factors except noise. Therefore, in the latter case, the convergence of the threshold value is retarded.

SUMMARY OF THE INVENTION

The present invention has been made in view of the above points, and a first object thereof is to provide a knock detection apparatus which is capable of changing a knock control starting time period appropriately so as to prevent erroneous knock determination, to thereby expand a knock control range.

A second object of the present invention is to provide a knock detection apparatus which is capable of calculating a current threshold value during the start of an internal combustion engine, using a threshold value stored during the immediately preceding operation of the engine, to thereby enhance convergence of the current threshold value.

A third object of the present invention is to provide a knock detection apparatus which is capable of changing the upper limit value of the amount of update of a threshold value according to a fuel injection amount and thereby enhance convergence of the threshold value.

A fourth object of the present invention is to provide a knock detection apparatus which is capable of changing the upper limit value of the amount of update of a threshold value according to a throttle opening degree and thereby enhance convergence of the threshold value.

To attain the above first object, in a first aspect of the present invention, there is provided a knock detection apparatus for detecting knock in an internal combustion engine. The knock detection apparatus comprises threshold value calculation means for calculating a threshold value for knock determination, based on a plurality of knock signals from the engine, knock determination means for performing the knock determination based on the threshold value, and knock determination control means for inhibiting execution of the knock determination based on the threshold value until a predetermined time period determined according to a temperature of the engine has elapsed during a start of the engine.

To attain the above second object, in a second aspect of the present invention, there is provided a knock detection apparatus capable of calculating a threshold value for knock determination based on a detected knock signal from an internal combustion engine. The knock detection apparatus comprises threshold value calculation means for calculating a threshold value based on a plurality of knock signals, threshold value-learning/storing means for learning and storing a threshold value based on the threshold value calculated by the threshold value calculation means; and threshold value setting means for setting a threshold value during a start of the engine, based on the threshold value learned and stored by the threshold value-learning/storing means.

To attain the above third object, in a third aspect of the present invention, there is provided a knock detection apparatus capable of calculating a threshold value for knock determination based on a detected knock signal from an internal combustion engine. The knock detection apparatus comprises threshold value calculation means for calculating a new threshold value by updating an immediately preceding threshold value based on a plurality of knock signals, threshold value update-limiting means for setting an upper limit value for limiting an amount of update of the threshold value calculated by the threshold value calculation means, and upper limit value-updating means for changing the upper limit value according to a fuel injection amount in the engine.

To attain the above fourth object, in a fourth aspect of the present invention, there is provided a knock detection apparatus capable of calculating a threshold value for knock determination based on a detected knock signal from an internal combustion engine. The knock detection apparatus comprises threshold value calculation means for calculating a new threshold value by updating an immediately preceding threshold value based on a plurality of knock signals, threshold value update-limiting means for setting an upper limit value for limiting an amount of update of the threshold value calculated by the threshold value calculation means, and upper limit value-updating means for changing the upper limit value according to a throttle opening degree of the engine.

The above and other objects, features and advantages of the present invention will become apparent from the following description when taken in conjunction with the accompanying drawings which illustrate preferred embodiments of the present invention by way of example.

BRIEF DESCRIPTION OF THE DRAWINGS

FIG. 5 is a table showing the relationship between coolant temperature and a feedback control start-inhibiting time period.

FIG. 6 is a table showing the relationship between oil temperature and the feedback control start-inhibiting time period.

FIG. 7 is a table showing the relationship between intake air temperature and the feedback control start-inhibiting time period.

FIG. 25 is a diagram showing an example of a coolant temperature-based background learning table.

FIG. 26 is a diagram showing an example of an intake air temperature-based background learning table.

FIG. 27 is a diagram showing an example of an oil temperature-based background learning table.

DESCRIPTION OF THE PREFERRED EMBODIMENTS

The present invention will now be described in detail with reference to the accompanying drawings showing preferred embodiments thereof.

First of all, a description will be given of the principles of a knock detection apparatus according to the present invention.

Figure 1:
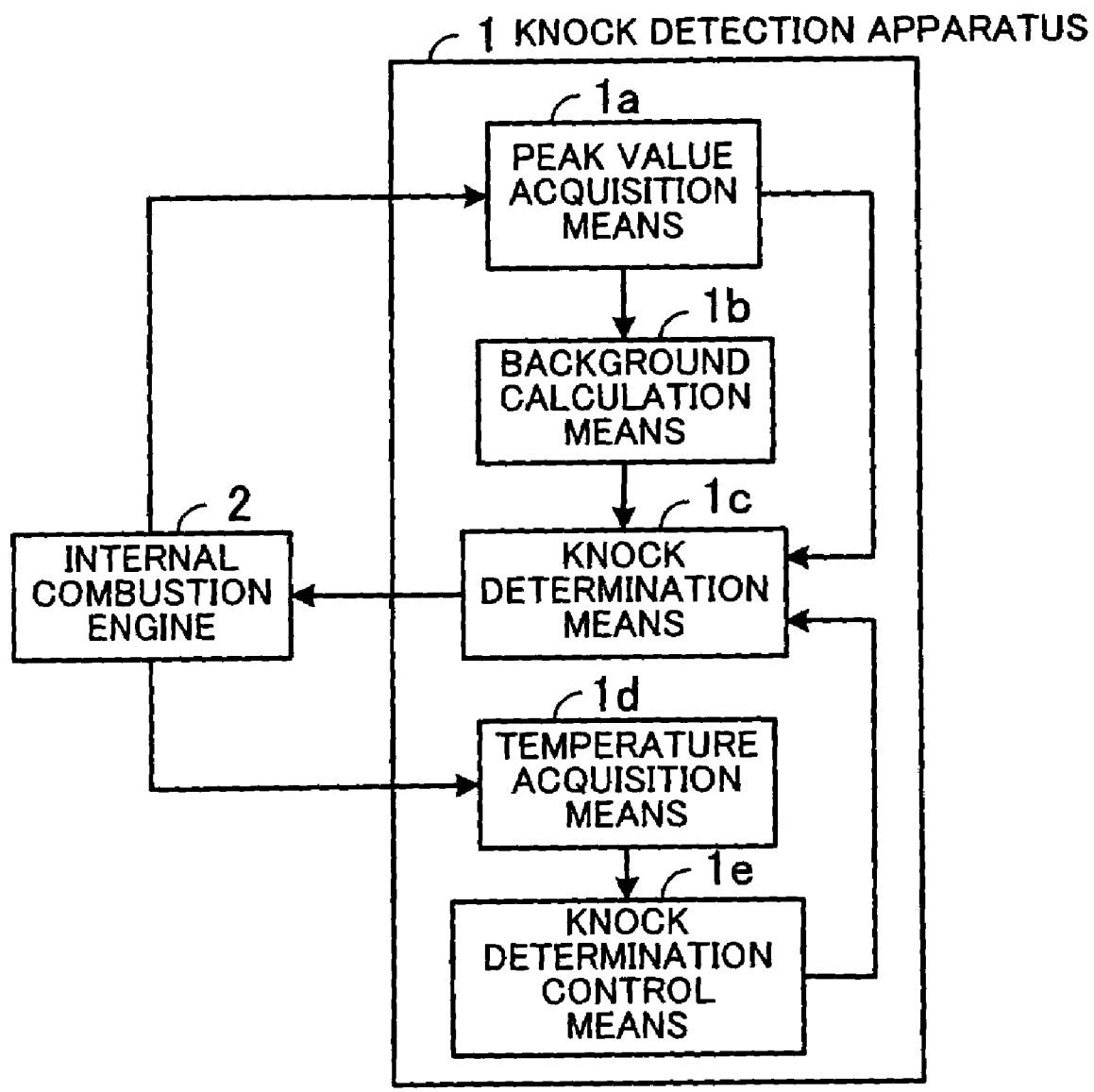
FIG. 1 is a diagram showing the outline of a knock detection apparatus.

FIG. 1 is a diagram showing the outline of the knock detection apparatus. As shown in FIG. 1, the knock detection apparatus 1 is comprised of a peak value acquisition means 1a, a background calculation means 1b, a knock determination means 1c, a temperature acquisition means 1d, and a knock determination control means 1e. The knock detection apparatus 1 performs knock feedback control by controlling the ignition timing of an internal combustion engine 2.

The peak value acquisition means 1a acquires a peak value (knock signal) indicative of vibration of the engine 2 during a predetermined period of a rotation cycle of a crankshaft of the engine 2. For example, a knock sensor for detecting vibration is fixed to the engine 2, and the peak value acquisition means 1a acquires the peak value indicative of vibration of the engine 2 from the knock sensor.

The background calculation means 1b averages peak values acquired by the peak value acquisition means 1a, to thereby calculate a background (threshold value). More specifically, a value obtained by subtracting the immediately preceding background from the currently acquired peak value is multiplied by a predetermined coefficient, and a value obtained by the multiplication is added to the immediately preceding background, whereby the current background is determined. The addend value (updating value) may be provided with an update guard value, for example.

The knock determination means 1c performs knock determination based on whether a peak value acquired by the peak value acquisition means 1a is higher than a predetermined level above the background. Then, knock in the engine 2 is feedback controlled based on the knock determination. For example, if the peak value is not higher than the predetermined level above the background, it is determined that knock has not occurred, and the ignition timing of the engine 2 is progressively advanced. On the other hand, if the peak value is higher than the predetermined level above the background, it is determined that knock has occurred, and the ignition timing of the engine 2 is retarded.

The temperature acquisition means 1d acquires temperature of the engine 2 at the start of the engine 2, e.g. when a starter is turned on. The temperature of the engine 2 includes coolant temperature, oil temperature, and intake air temperature, of the engine 2, and these temperatures are acquired from respective associated sensors fixed to the engine 2.

The knock determination control means 1e inhibits operation of the knock determination means 1c until a predetermined time period calculated based on the temperature of the engine 2 acquired by the temperature acquisition means 1d has elapsed.

Thus, during the start of the engine 2, execution of knock determination based on the background is inhibited until the predetermined time period determined based on the temperature of the engine 2 has elapsed. This makes it possible to change the start time of knock determination so as to prevent erroneous knock determination, thereby expanding a knock control range.

Next, a knock detection apparatus according to a first embodiment of the present invention will be described in detail with reference to FIG. 2.

Figure 2:
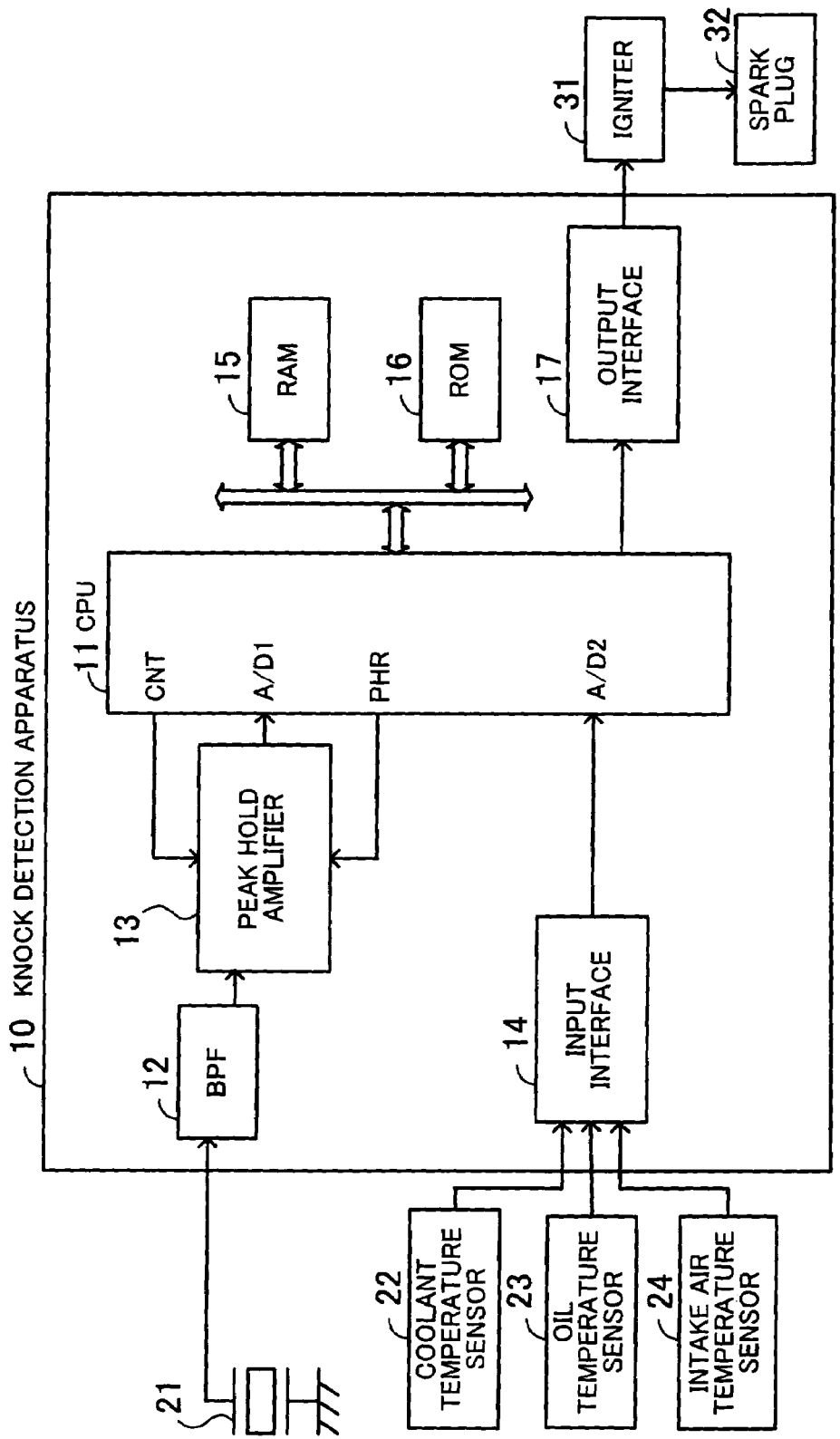
FIG. 2 is a block diagram of the configuration of a knock detection apparatus according to a first embodiment.

FIG. 2 is a block diagram of the configuration of the knock detection apparatus according to the first embodiment. As shown in FIG. 2, the knock detection apparatus 10 is comprised of a CPU 11, a BPF 12, a peak hold amplifier 13, an input interface 14, a RAM 15, a ROM 16, an output interface 17. The knock detection apparatus 10 is connected to a knock sensor 21, a coolant temperature sensor 22, an oil temperature sensor 23, and an intake air temperature sensor 24. Further, an igniter 31 connected to each spark plug 32 is connected to the knock detection apparatus 10.

The knock sensor 21 is a vibration sensor for converting engine vibration into an electric signal. The knock sensor 21 is formed e.g. by a piezoelectric element and is fixed to an engine cylinder block or the like.

An electric signal output from the knock sensor 21 is input to the BPF 12. The BPF 12 filters the electric signal to thereby obtain only a signal i.e. a component of the electric signal in a frequency band from which a nock signal can appear. The BPF 12 has a center frequency of 4 kH and a bandwidth of 1 to 100 kH, for example.

The signal obtained by filtration by the BPF 12 is input to the peak hold amplifier 13. Further, a gate control signal output from a control (CNT) terminal of the CPU 11, and a peak hold reset signal output from a peak hold reset (PHR) terminal of the CPU 11 are input to the peak hold amplifier 13. As long as the gate control signal is output from the CNT terminal of the CPU 11, the peak hold amplifier 13 holds the peak value of the signal output from the BPF 12 while updating the same. Then, when the peak hold reset signal is output from the PHR terminal of the CPU 11, the peak hold amplifier 13 resets the held peak value. The held peak value is input to an analog-to-digital (A/D) conversion terminal A/D1 of the CPU 11.

The coolant temperature sensor 22, the oil temperature sensor 23, and the intake air temperature sensor 24 convert coolant temperature, oil temperature, and intake air temperature of the engine into respective electric signals, to output the signals. The signals from the coolant temperature sensor 22, the oil temperature sensor 23, and the intake air temperature sensor 24 are input to an analog-to-digital (A/D) conversion terminal A/D2 of the CPU 11 via the input interface 14.

The RAM 15 and the ROM 16 are connected to the CPU 11 via a bus. The RAM 15 temporarily stores at least part of an OS (Operating System) executed by the CPU 11 and application programs for performing knock feedback control. The RAM 15 also stores various data necessitated in processing by the CPU 11. The ROM 16 stores the OS, the application programs, and various data. It should be noted that the RAM 15 and the ROM 16 may be incorporated in the CPU 11. Further, the ROM 16 may be replaced by a rewritable flash memory or the like.

The igniter 31 connected to the spark plug 32 is connected to the CPU 11 via the output interface 17. The igniter 31 drivingly controls the ignition timing of the spark plug 32 in response to an instruction from the CPU 11.

The CPU 11 performs analog-to-digital conversion of the peak value input to the A/D conversion terminal A/D1, and determines whether or not engine knock has occurred. Then, the CPU 11 feedback controls the ignition timing of the spark plug 32 based on the result of the determination. More specifically, if it is determined that knock has not occurred, the CPU 11 performs knock feedback control such that the ignition timing of the spark plug 32 is progressively advanced, whereas if it is determined that knock has occurred, the CPU 11 performs knock feedback control such that the ignition timing of the spark plug 32 is retarded.

The CPU 11 is capable of properly changing a knock feedback control start-inhibiting time period so as to prevent erroneous knock determination. For example, if the background converges to a peak value early after the start of the engine, the CPU 11 causes the knock feedback control to be started early, whereas if the background converses late, the CPU 11 causes the knock feedback control to be started late.

The CPU 11 performs analog-to-digital conversion of the signals input to the A/D conversion terminal A/D2 from the coolant temperature sensor 22, the oil temperature sensor 23, and the intake air temperature sensor 24, to thereby acquire coolant temperature, oil temperature, and intake air temperature of the engine. The ROM 16 stores knock feedback control start-inhibiting time periods in association with predetermined values of coolant temperature, oil temperature, and intake air temperature, and the CPU 11 calculates knock feedback control start-inhibiting time periods associated with the coolant temperature, the oil temperature, and the intake air temperature obtained from the respective sensors with reference to the ROM 16.

Next, a description will be given of knock determination.

Figure 3:
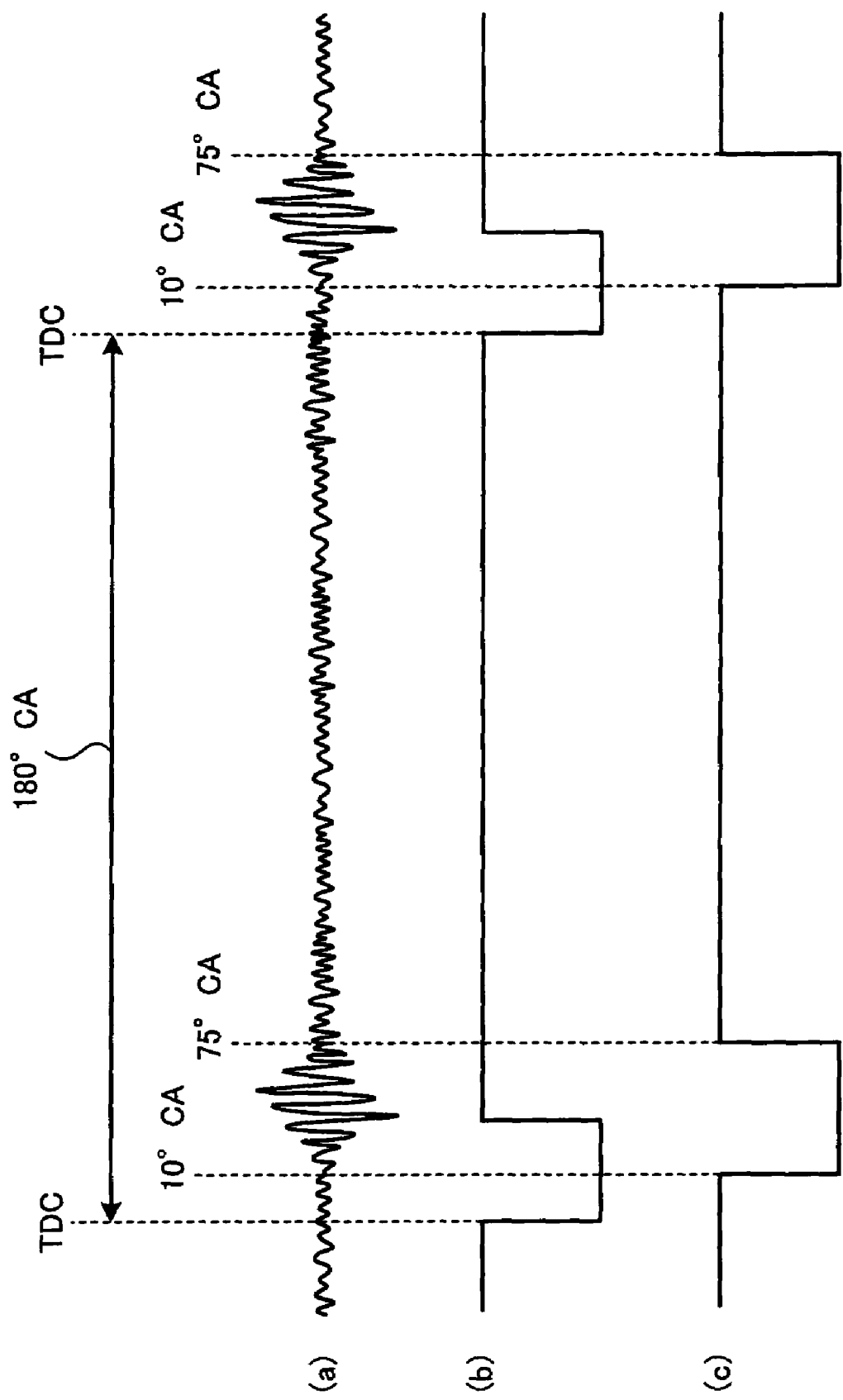
FIG. 3 is a diagram showing waveforms useful in explaining knock determination.

FIG. 3 is a diagram showing waveforms useful in explaining the knock determination. FIG. 3(a) shows the waveform of a signal input to the peak hold amplifier 13. FIG. 3(b) shows the waveform of a signal output from a crank angle sensor, not shown in FIG. 2, of the engine. A pulse is output from the crank angle sensor whenever the piston of each cylinder reaches the TDC position immediately before starting an explosion stroke. In a four-cylinder four-cycle engine, for example, the pulse is output whenever the crankshaft rotates through 180 degrees (i.e. at each 180° CA (crank angle)). FIG. 3(c) shows the waveform of the gate control signal output from the CNT terminal of the CPU 11.

The peak hold amplifier 13 updates the peak value of the signal output from the BPF 12 and holds the updated peak value during a knock observation period set to a range of 10° CA to 75° CA by the gate control signal output from the CPU 11. The peak value held by the peak hold amplifier 13 is input to the A/D conversion terminal A/D1 of the CPU 11. After the peak value is input to the CPU 11 and subject to the analog-to-digital conversion, the peak hold reset signal is output from the PHR terminal, and the peak value held by the peak hold amplifier 13 is reset.

The CPU 11 calculates the background based on the peak value after the analog-to-digital conversion "AD converted peak value". The background is calculated e.g. by the following equation (1):

$$BG = \text{immediately preceding } BG + (\text{current peak value} - \text{immediately preceding } BG) \times (1/\text{averaging value}) \quad (1)$$

wherein BG represents the background, and the averaging value is larger than 1. It should be noted that the update guard value may be set so as to prevent a change in the background from exceeding a predetermined amount.

As is apparent from the equation (1), the background is obtained by averaging peak values. The CPU 11 determines whether or not the currently A/D converted peak value is higher than a predetermined level above the background obtained by the equation (1), to thereby perform determination as to whether knock has occurred. Whether or not knock has occurred is determined e.g. by the following equation (2):

$$Y = BG \times K \quad (2)$$

wherein K represents a value changed according to the engine speed and load on the engine.

When the currently A/D converted peak value is larger than the value Y obtained by multiplying the background by K, it is determined that knock has occurred. Then, feedback control is performed so as to retard the ignition timing of the spark plug 32 which has been progressively advanced.

The background is obtained by averaging peak values as described above. For this reason, background convergence time required for the background to converge to a peak value varies depending on the magnitude of peak values. For example, as the difference between the background and the peak value is larger, the background convergence time is longer.

Figure 4:
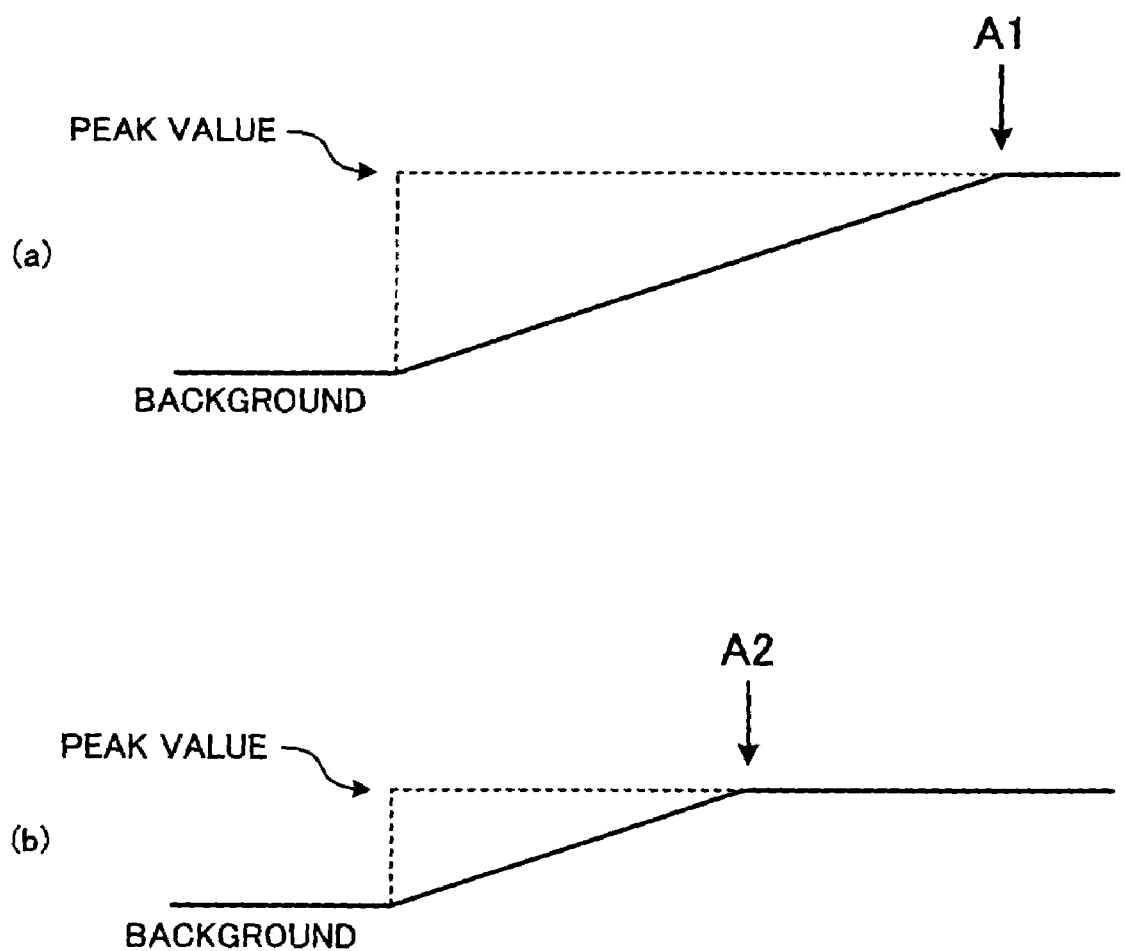
FIG. 4 is a diagram useful in explaining background convergence time.

FIG. 4 is a diagram useful in explaining background convergence time. FIGS. 4(a) and 4(b) each show the relationship between the background and a peak value. A peak value in FIG. 4(a) is larger than one in FIG. 4(b).

When the engine is started, the peak value is output from the peak hold amplifier 13. The CPU 11 calculates the background based on the equation (1). Since the background is obtained by averaging peak values, it progressively converges to the peak value as shown in FIGS. 4(a) and 4(b).

As mentioned hereinabove, the larger the difference between the background and the peak value, the longer the background convergence time. Since the peak value in FIG. 4(a) is larger than that in FIG. 4(b), the background convergence time in FIG. 4(a) is longer than that in FIG. 4(b). Taking the fact into consideration, after the start of the engine, the CPU 11 changes the knock feedback control start-inhibiting time period according to the current background convergence time so as to prevent feedback control from being executed based on erroneous knock determination. For example, in the case of FIG. 4(a), the knock feedback control start-inhibiting time period is adjusted such that knock feedback control is started at a time point indicated by an arrow A1. In the case of FIG. 4(b), the knock feedback control start-inhibiting time period is adjusted such that knock feedback control is started at a time point indicated by an arrow A2.

Next, a description will be given of the relationship between coolant temperature, oil temperature, and intake air temperature of the engine, and the knock feedback control start-inhibiting time period. As described with reference to FIG. 4, the background convergence time after the start of the engine depends on the magnitude of a peak value. The magnitude of the peak value varies depending on the conditions of the engine, such as coolant temperature, oil temperature, and intake air temperature. Therefore, the CPU 11 acquires coolant temperature, oil temperature, and intake air temperature from the respective associated sensors, and calculates a time period to elapse before starting control, by referring to knock feedback control start-inhibiting time periods stored in the ROM 16 in association with the coolant temperature, the oil temperature, and the intake air temperature of the engine.

FIG. 5 is a table showing the relationship between coolant temperature and the feedback control start-inhibiting time period. As shown in FIG. 5, the coolant temperature table 41 has rows of boxes of coolant temperature values and feedback control start-inhibiting time periods, and stores, in each box of the feedback control start-inhibiting time periods, a knock feedback control start-inhibiting time period associated with a coolant temperature value, as a time period to elapse before starting the knock feedback control after the start of the engine. The unit of values shown in the respective boxes of coolant temperature is ° C., and the unit of values shown in the respective boxes of the feedback control start-inhibiting time periods is second. The coolant temperature table 41 is constructed in a storage device, such as the ROM 16 appearing in FIG. 2.

The CPU 11 calculates the knock feedback control start-inhibiting time period associated with the coolant temperature of the engine as a time period to elapse before starting the knock feedback control after the start of the engine, with reference to the coolant temperature table 41. When the coolant temperature acquired from the coolant temperature sensor 22 falls between respective values of two coolant temperature boxes shown in the coolant temperature table 41, the knock feedback control start-inhibiting time period is calculated by interpolation based on the values of coolant temperature in the two boxes. For example, when coolant temperature acquired from the coolant temperature sensor 22 is between 10° C. and 30° C., the CPU 11 acquires a knock feedback control start-inhibiting time period of 5.1 sec. corresponding to the coolant temperature 10° C. and a knock feedback control start-inhibiting time period of 3.1 sec. corresponding to the coolant temperature 30° C., and interpolates these knock feedback control start-inhibiting time periods to thereby calculate a knock feedback control start-inhibiting time period associated with the acquired coolant temperature.

FIG. 6 is a table showing the relationship between oil temperature and feedback control start-inhibiting time period. As shown in FIG. 6, the oil temperature table 42 has rows of boxes of oil temperature values and feedback control start-inhibiting time periods, and stores, in each box of the feedback control start-inhibiting time periods, a knock feedback control start-inhibiting time period associated with an oil temperature value as a time period to elapse before starting the knock feedback control after the start of the engine. The unit of values shown in the respective boxes of the oil temperature is ° C., and the unit of values shown in the respective boxes of feedback control start-inhibiting time periods is second. The oil temperature table 42 is constructed in the storage device, such as the ROM 16 appearing in FIG. 2.

The CPU 11 calculates the knock feedback control start-inhibiting time period associated with the oil temperature value of the engine with reference to the oil temperature table 42. The method of calculating the knock feedback control start-inhibiting time period associated with the oil temperature is similar to the method of calculating the knock feedback control start-inhibiting time period associated with the coolant temperature, which is described hereinbefore with reference to FIG. 5, and therefore detailed description thereof is omitted.

FIG. 7 is a table showing the relationship between intake air temperature and the feedback control start-inhibiting time period. As shown in FIG. 7, the intake air temperature table 43 has rows of boxes of intake air temperature values and feedback control start-inhibiting time periods, and stores, in each box of the feedback control start-inhibiting time periods, a knock feedback control start-inhibiting time period associated with an intake air temperature value as a time period to elapse before starting the knock feedback control after the start of the engine. The unit of values shown in the respective boxes of intake air temperature is ° C., and the unit of values shown in the respective boxes of knock feedback control start-inhibiting time periods is second. The intake air temperature table 43 is constructed in the storage device, such as the ROM 16 appearing in FIG. 2.

The CPU 11 calculates the knock feedback control start-inhibiting time period associated with the intake air temperature value of the engine with reference to the intake air temperature table 43. The method of calculating the knock feedback control start-inhibiting time period associated with the intake air temperature is similar to the method of calculating the knock feedback control start-inhibiting time period associated with the coolant temperature, which is described hereinbefore with reference to FIG. 5, and therefore detailed description thereof is omitted.

As described above, the CPU 11 acquires engine coolant temperature, engine oil temperature, and engine intake air temperature from the respective associated sensors, at the start of the engine, and calculates knock feedback control start-inhibiting time periods associated with the acquired temperatures.

Next, the operation of the CPU 11 will be described using a flowchart.

Figure 8:
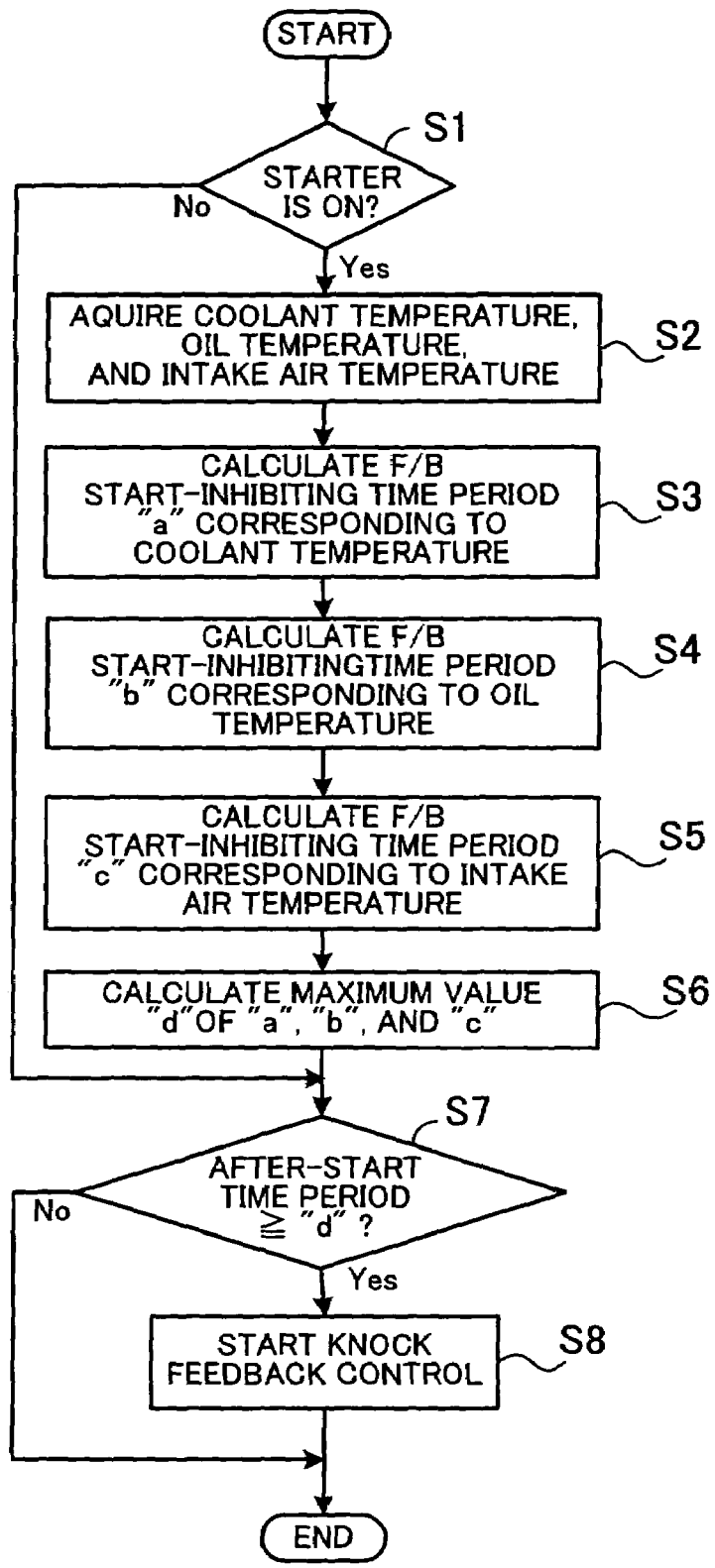
FIG. 8 is a flowchart showing a process for calculating the feedback control start-inhibiting time period.

FIG. 8 is a flowchart showing a process for calculating the feedback control start-inhibiting time period. The CPU 11 executes the process by following steps described below.

In step S1, the CPU 11 determines whether or not the starter has been switched from OFF to ON, so as to receive engine coolant temperature, engine oil temperature, and engine intake air temperature at the start of the engine. If the starter has been switched from OFF to ON, the process proceeds to step S2, whereas if the starter has not been switched from OFF to ON, the process proceeds to step S7.

In the step S2, the CPU 11 acquires engine coolant temperature, engine oil temperature, and engine intake air temperature from the coolant temperature sensor 22, the oil temperature sensor 23, and the intake air temperature sensor 24, respectively.

In step S3, the CPU 11 calculates a knock feedback control (F/B) start-inhibiting time period "a" corresponding to the coolant temperature acquired in the step S2, with reference to the coolant temperature table 41. In step S4, the CPU 11 calculates a knock feedback control start-inhibiting time period "b" corresponding to the oil temperature acquired in the step S2, with reference to the oil temperature table 42. In step S5, the CPU 11 calculates a knock feedback control start-inhibiting time period "c" corresponding to the intake air temperature acquired in the step S2, with reference to the intake air temperature table 43. In step S6, the CPU 11 calculates a maximum value "d" of the knock feedback control start-inhibiting time periods "a" to "c" calculated in the respective steps S3 to S5.

In step S7, the CPU 11 determines whether or not a time period corresponding to the maximum value "d" calculated in the step S6 has elapsed after the start of the engine. If the time period corresponding to the maximum value "d" has elapsed, the process proceeds to step S8. If the time period corresponding to the maximum value "d" has not elapsed, the process shown in FIG. 8 is terminated. Thereafter, when a next interrupt occurs, the process is repeated from the start.

In the step S8, the CPU 11 starts knock feedback control. More specifically, if it is determined by the knock determination that knock has not occurred, knock feedback control is started so as to progressively advance the ignition timing of the spark plug 32, whereas if knock has occurred, knock feedback control is started so as to retard the ignition timing of the spark plug 32.

Next, the operation of the CPU 11 will be described using a control chart.

Figure 9:
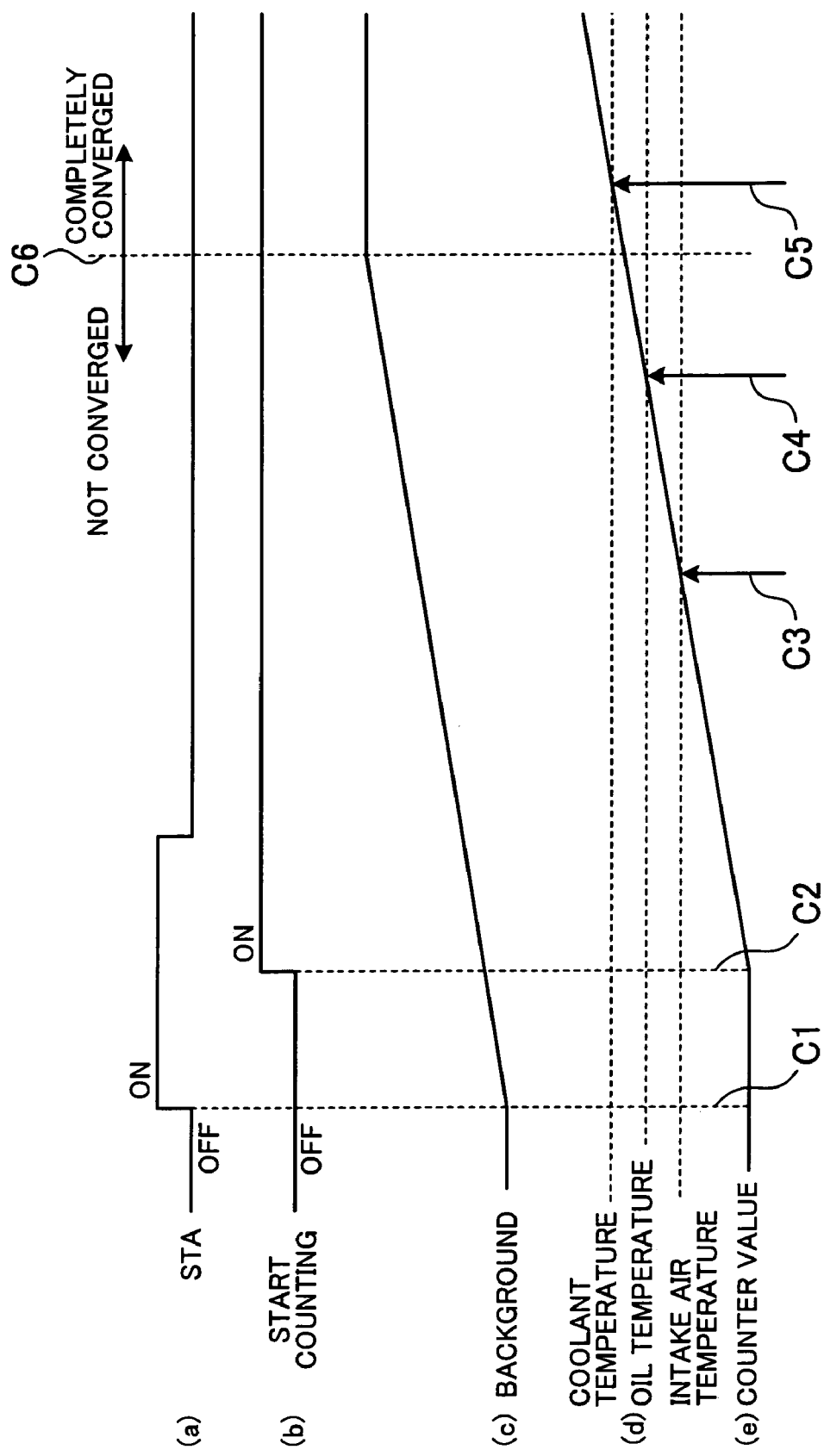
FIG. 9 is a control chart for calculating the feedback control start-inhibiting time period.

FIG. 9 is the control chart for calculating the feedback control start-inhibiting time period. FIG. 9(*a*) illustrates a waveform showing ON/OFF timing of the starter. FIG. 9(*b*) illustrates a waveform showing timing in which the knock feedback control start-inhibiting time period starts to be counted after the start of the engine. FIG. 9(c) illustrates a waveform of the background. FIG. 9(d) shows count values calculated, respectively, based on coolant temperature, oil temperature, and intake air temperature, for starting the knock feedback control. FIG. 9(e) shows a counter value of a time counter that counts time.

As shown by a broken line C1, when the starter is switched from OFF to ON, the CPU 11 starts calculation of the background. The background is a value obtained by averaging peak values, and therefore, after the start of the engine, it progressively converges to a peak value as shown in FIG. 9(c). Further, the CPU 11 acquires engine coolant temperature, engine oil temperature, and engine intake air temperature from the respective associated sensors, and calculates knock feedback control start-inhibiting time periods (count values) corresponding to the acquired coolant temperature, oil temperature, and intake air temperature, with reference to the coolant temperature table 41, the oil temperature table 42, and the intake air temperature table 43, respectively. It should be noted that in the illustrated example, the count values for starting knock feedback control corresponding to the coolant temperature, the oil temperature, and the intake air temperature are assumed to be in the relationship of coolant temperature-associated count value>oil temperature-associated count value>intake air temperature-associated count value, as shown in FIG. 9(d). That is, the count value associated with the coolant temperature is calculated as the maximum value.

When having calculated the count values for starting knock feedback control, the CPU 11 starts counting the time period for starting the knock feedback control, as shown in FIG. 9(b). In response to this, count-up of the counter value of the time counter is started, as shown in FIG. 9(e), at a time point indicated by a broken line C2.

The counter value is counted up, and reaches the count value for starting knock feedback control based on the intake air temperature, as indicated by an arrow C3. However, in the case of the example shown in FIG. 9, the count value associated with the intake air temperature is not the maximum value of the three count values for starting knock feedback control, and hence the CPU 11 does not start knock feedback control.

Then, the counter value is further counted up, and reaches the count value for starting knock feedback control based on the oil temperature, as indicated by an arrow C4. However, in the case of the example shown in FIG. 9, the count value associated with the oil temperature is not the maximum value of the three count values for starting knock feedback control, and hence the CPU 11 does not start knock feedback control.

Then, the counter value is further counted up, and reaches the count value for starting knock feedback control based on the coolant temperature, as indicated by an arrow C5. In the case of the example shown in FIG. 9, the count value associated with the coolant temperature is the maximum value of the three count values for starting knock feedback control, and therefore the CPU 11 starts knock feedback control. The knock feedback control is started after the background has converged to the peak value as shown by a broken line C6. Knock feedback control is thus started upon the lapse of the longest one of the three knock feedback control start-inhibiting time periods calculated respectively based on the coolant temperature, the oil temperature, and the intake air temperature, whereby even if some convergence time periods too short for the background to converge are calculated, it is possible to change the knock feedback control start-inhibiting time period with safety, thereby expanding the knock control range.

As described above, at the start of the engine, coolant temperature, oil temperature, and intake air temperature are acquired for determining convergence time periods required for the background to converge to a peak value, and the background convergence time periods are calculated based on the acquired coolant temperature, oil temperature, and intake air temperature. This makes it possible to change the knock feedback control start-inhibiting time period appropriately so as to prevent erroneous knock determination, to thereby expand the knock control range.

Further, after the start of the engine, the knock feedback control start-inhibiting time period is changed so as to prevent erroneous knock determination, so that erroneous retardation of the ignition timing of the engine can be prevented.

Furthermore, the use of the maximum value of the convergence time periods determined based on the acquired coolant temperature, oil temperature, and intake air temperature makes it possible to start knock feedback control more safely, thereby preventing erroneous retardation of the ignition timing of the engine.

Although in the above described embodiment, knock feedback control is started based on the maximum value of the convergence time periods calculated based on the parameters of coolant temperature, oil temperature, and intake air temperature, a convergence time period based on a single parameter or the maximum value of more than one parameters may be used to start knock feedback control. For example, only the coolant temperature-based convergence time period may be calculated to start knock feedback control, or alternatively only the coolant temperature-based convergence time period and oil temperature-based convergence time period may be calculated to start knock feedback control.

Next, a knock detection apparatus according to a second embodiment of the present invention will be described in detail with reference to drawings. In the second embodiment, the number of sample peak values required for the background to converge to an appropriate value is calculated based on a peak value acquired after the start of the engine, and after sample peak values of the calculated number are acquired, knock feedback control is started.

The background, which is obtained by averaging peak values as shown by the equation (1), never converges to an appropriate value during the start of the engine before a predetermined number of sample peak values have been acquired. The number of sample peak values required for the background to converge to the appropriate value varies depending on the magnitude of acquired peak values, and as the difference between the background and the peak value is larger, a larger number of sample peak values are required for the background to converge to the appropriate value. Further, the number of sample peak values required for the background to converge to the appropriate value also varies depending on an averaging coefficient (reciprocal of an averaging value) for use in averaging peak values. For these reasons, the CPU 11 appearing in FIG. 2 calculates the number of sample peak values required for calculating an appropriate background, acquires sample peak values of the calculated number, and then starts knock feedback control. For example, the CPU 11 sets the number of sample peak values required for starting knock feedback control to a value obtained by dividing a first peak value acquired immediately after the start of the engine, by an averaging coefficient.

Now, a description will be given of the relationship between the number of sample peak values and the engine speed. A time period for acquiring all required sample peak values of the calculated number is proportional to the engine speed. The higher the engine speed, the shorter the time period for acquiring all the sample peak values is, and the lower the engine speed, the longer the time period for acquiring all the sample peak values.

Figure 10:
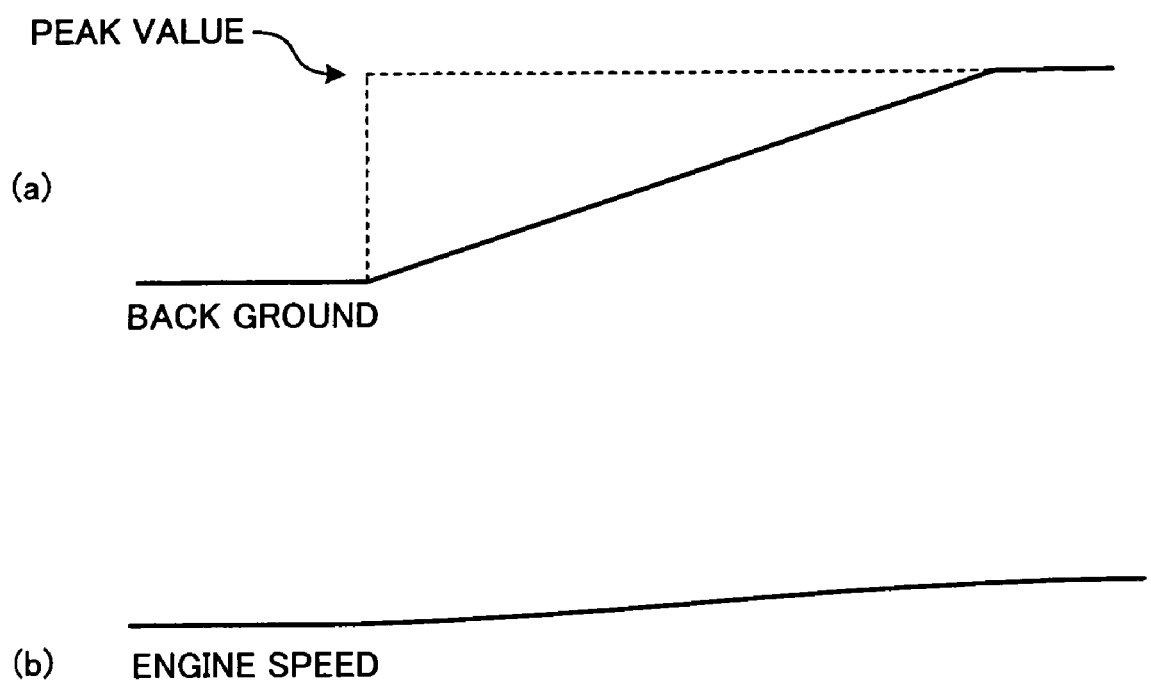
FIG. 10 is a diagram showing a background and engine speed.

FIG. 10 is a diagram showing the background and engine speed. FIG. 10(a) shows a peak value and the background, and FIG. 10(b) shows engine speed. Peak values are sampled in proportion to engine speed. The CPU 11 calculates the number of sample peak values required for calculation of the background, and starts knock feedback control early if engine speed is high, and late if engine speed is low.

Next, the operation of the CPU 11 will be described using a flowchart.

Figure 11:
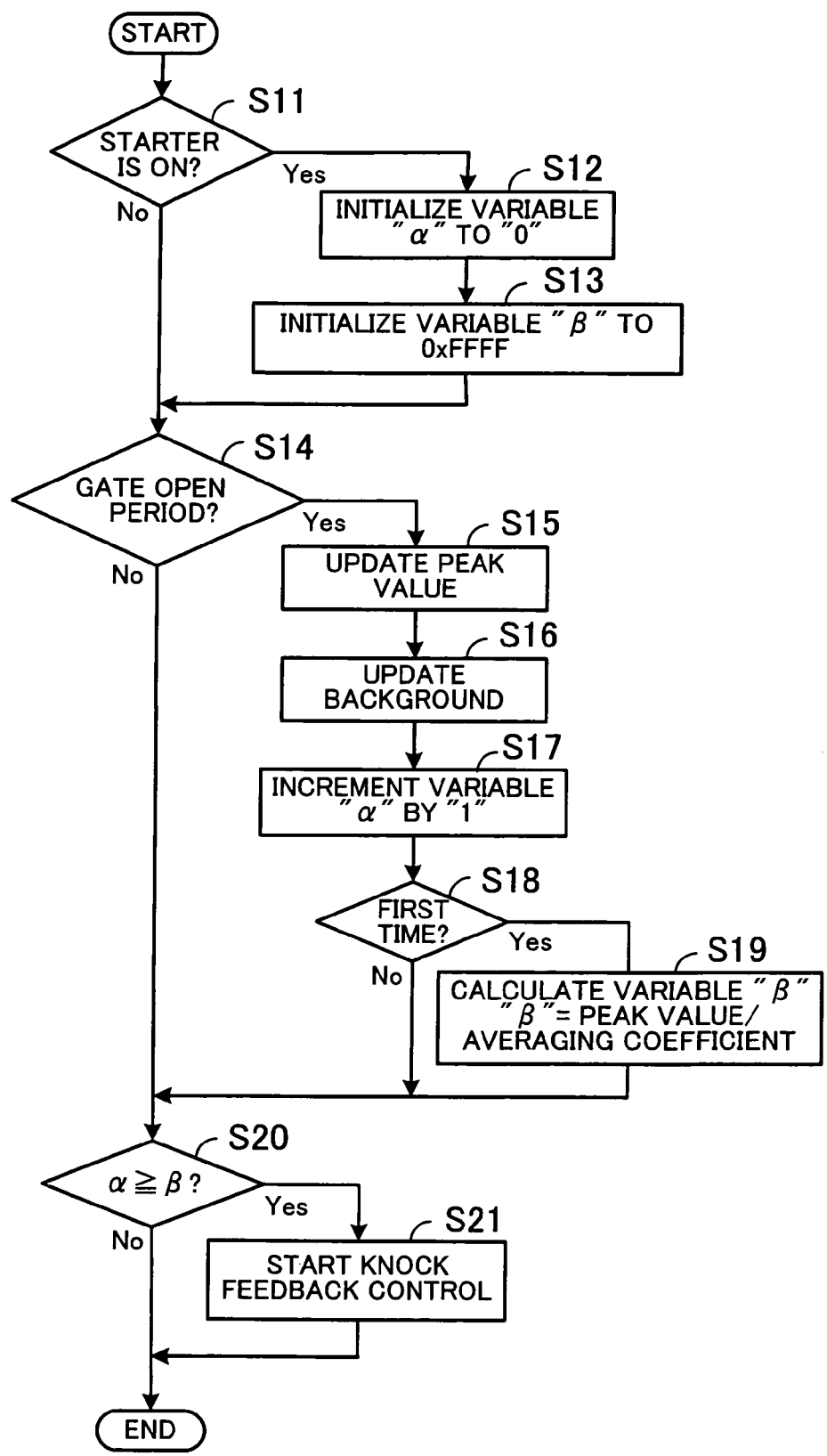
FIG. 11 is a flowchart showing a process for calculating the number of sample peak values required for starting feedback control.

FIG. 11 is a flowchart showing a process for calculating the number of sample peak values required for starting feedback control. The CPU 11 executes the process at predetermined time intervals, following steps described below.

In step S11, the CPU 11 determines whether or not the starter has been switched from OFF to ON, so as to initialize variables α and β. If the starter has been switched from OFF to ON, the process proceeds to step S12, whereas if the starter has not been switched from OFF to ON, the process proceeds to step S14.

In the step S12, the CPU 11 initializes the variable α for counting the number of sampled peak values to a minimum value (e.g. 0). In step S13, the CPU 11 initializes the variable β indicative of the number of sample peak values required for starting knock feedback control to a maximum value (e.g. 0xFFFF).

In the step S14, the CPU 11 determines whether or not a knock feedback control-related process keep the gate open (during a knock observation period). More specifically, it is determined whether or not the gate control signal explained with reference to FIG. 2 is being output to the peak hold amplifier 13. If the knock feedback control-related process keeps the gate open, the process proceeds to step S15, whereas if not, the process proceeds to step S20.

In the step S15, the CPU 11 updates the peak value. In other words, a new peak value is acquired from the peak hold amplifier 13. In step S16, the CPU 11 updates the background based on the acquired peak value. In step S17, the CPU 11 increments the variable α by 1.

In step S18, the CPU 11 determines whether or not the steps S15 to S17 have been executed for the first time. If the steps S15 to S17 have been executed for the first time, the process proceeds to step S19, whereas if not, the process proceeds to the step S20.

In the step S19, the CPU 11 calculates the variable β indicative of the number of sample peak values required for starting knock feedback control. The variable P is expressed by the following equation (3):

$$\beta = \text{peak value/averaging coefficient} \quad (3)$$

wherein the averaging coefficient is the reciprocal of an averaging value.

The equation (3) means that the number of sample peak values required for starting knock feedback control is proportional to the peak value. As the peak value is larger, the number of sample peak values becomes larger. Further, the number of sample peak values required for starting knock feedback control is inversely proportional to the averaging coefficient. As the averaging coefficient is smaller, more sample peak values are required for the background to converge to the peak value.

In the step S20, the CPU 11 determines whether or not the variable α for counting the number of sampled peak values has become equal to or larger than the variable β indicative of the number of sample peak values required for starting knock feedback control. If the variable α is equal to or larger than the variable β, the process proceeds to step S21. If the variable α is smaller than the variable β, the process shown by the flowchart in FIG. 11 is terminated, and when a next interrupt occurs, the process is repeated from the start.

In the step S21, the CPU 11 starts knock feedback control.

As described above, the number of sample peak values required for calculation of the background is calculated based on the magnitude of a peak value acquired at the start of the engine. Then, only after sample peak values of the calculated number are acquired, and then knock feedback control is started. This makes it possible to change the knock feedback control start time appropriately to prevent erroneous knock determination, thereby expanding the knock control range.

Further, after the start of the engine, the knock feedback control start time is changed so as to prevent erroneous knock determination, so that erroneous retardation of the ignition timing of the engine can be prevented.

It should be noted that the first embodiment and the second embodiment can be combined. For example, the number of sample peak values required for starting knock feedback control is calculated as described in the second embodiment. Then, sample peak values of the calculated number are acquired, and then a knock feedback control start-inhibiting time period i.e. a time period to elapse thereafter is calculated based on coolant temperature, oil temperature, and intake air temperature, as described as to the first embodiment, and when the calculated time period to elapse has elapsed, knock feedback control is started. More specifically, when the variable α has become equal to or larger than the variable β in the step S20 of the flowchart in FIG. 11, the steps S2 et seq. shown in FIG. 8 are executed.

Next, a knock detection apparatus according to a third embodiment of the present invention will be described in detail with reference to drawings. As long as the starter is on, the engine is being cranked by a starter motor, and hence noise is liable to be produced, which can cause an error in knock determination. To eliminate this fear, according to the third embodiment, when the starter is switched from ON to OFF after the start of the engine, the counting of the knock feedback control start-inhibiting time period to elapse before starting knock feedback control is started so as to ensure that knock feedback control is executed after the starter is turned off.

Figure 12:
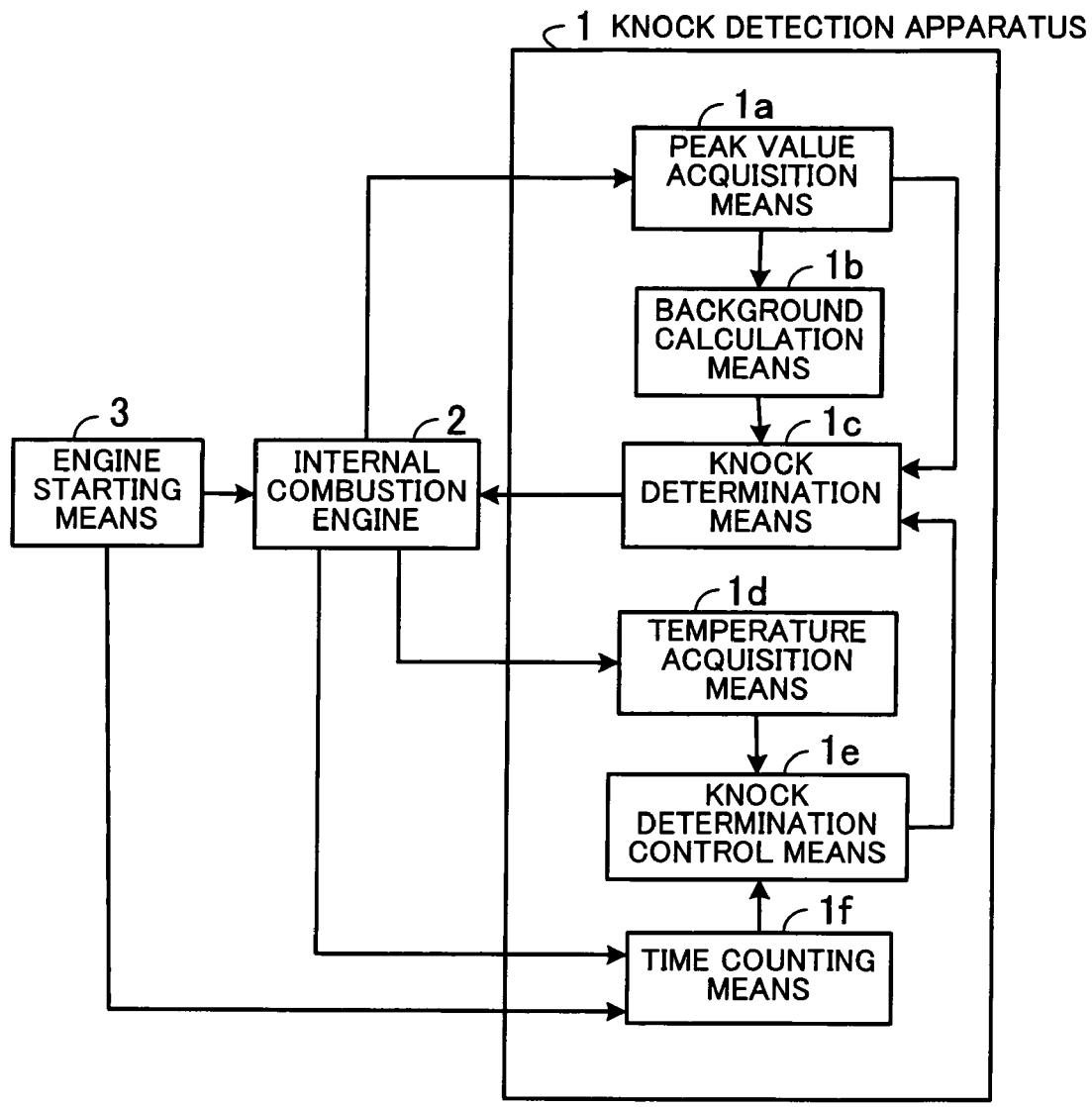
FIG. 12 is a diagram showing the outline of a knock detection apparatus, according to a third embodiment of the present invention.

FIG. 12 is a diagram showing the outline of the knock detection apparatus. FIG. 12 is distinguished from FIG. 1 in that an engine starting means 3 and a time counting means 1f are shown. Component elements in FIG. 12 identical or similar in function to those in FIG. 1 are designated by identical reference numerals, and detailed description thereof is omitted.

The engine starting means 3 in FIG. 12 is an electric motor (starter) which executes cranking for starting the internal combustion engine 2. The engine starting means 3 outputs ON and OFF signals to the time counting means 1f.

The time counting means 1f receives from the engine 2 a signal indicative of whether or not the engine 2 has been started, as well as the ON and OFF signals from the engine starting means 3. When the signal indicative of the start of the engine 2 is input from the engine 2 and the OFF signal from the engine starting means 3, the time counting means 1f permits the knock determination control means 1e to count a predetermined time period. More specifically, after the engine 2 is started by the engine starting means 3, and the engine starting means 3 is turned off, the time counting means 1f enables the knock determination control means 1e to start counting the predetermined time period. In response to the time counting control by the time counting means 1f, the knock determination control means 1e starts counting the predetermined time period calculated based on temperature of the engine 2, and when the predetermined time period has elapsed, cancels the inhibition of the operation of the knock determination means 1c.

As described above, the counting of the predetermined time period to elapse before starting knock feedback control is started after the start of the engine 2 and the turn-off of the engine starting means 3. As a consequence, knock feedback control is executed after the engine starting means 3 is turned off, so that it is possible to reduce influence of noise due to cranking of the engine starting means 3, thereby preventing erroneous knock determination.

Next, a description will be given of the configuration of the knock detection apparatus.

Figure 13:
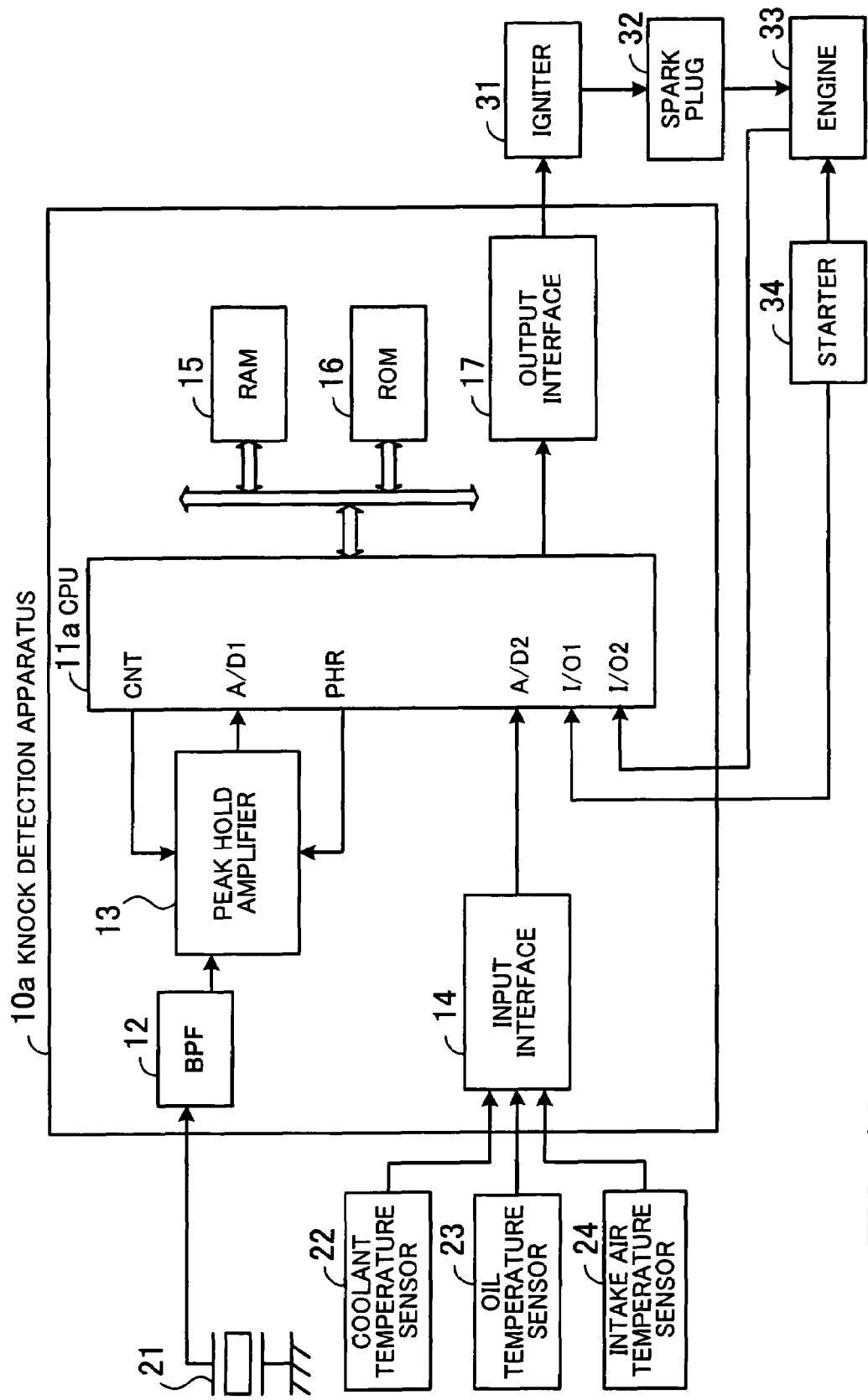
FIG. 13 is a block diagram of the configuration of the knock detection apparatus.

FIG. 13 is a block diagram of the configuration of the knock detection apparatus. FIG. 13 is distinguished from FIG. 2 in that an engine 33 and a starter 34 are shown. Further, a CPU 11a of the knock detection apparatus 10a includes an input/output I/O1 and an input/output I/O2. Component elements in FIG. 13 identical or similar in function to those in FIG. 2 are designated by identical reference numerals, and description thereof is omitted.

The starter 34 is turned on and off e.g. by a user's key operation to start the engine 33. When started, the engine 33 outputs a signal indicative of the start thereof to the input/output I/O2 of the CPU 11a.

When the signal indicative of the start of the engine is input to the input/output I/O2 and the OFF signal is input to the input/output I/O1 from the starter 34, the CPU 11a starts counting a time period to elapse before starting knock feedback control.

Next, the operation of the CPU 11a will be described using a control chart.

Figure 14:
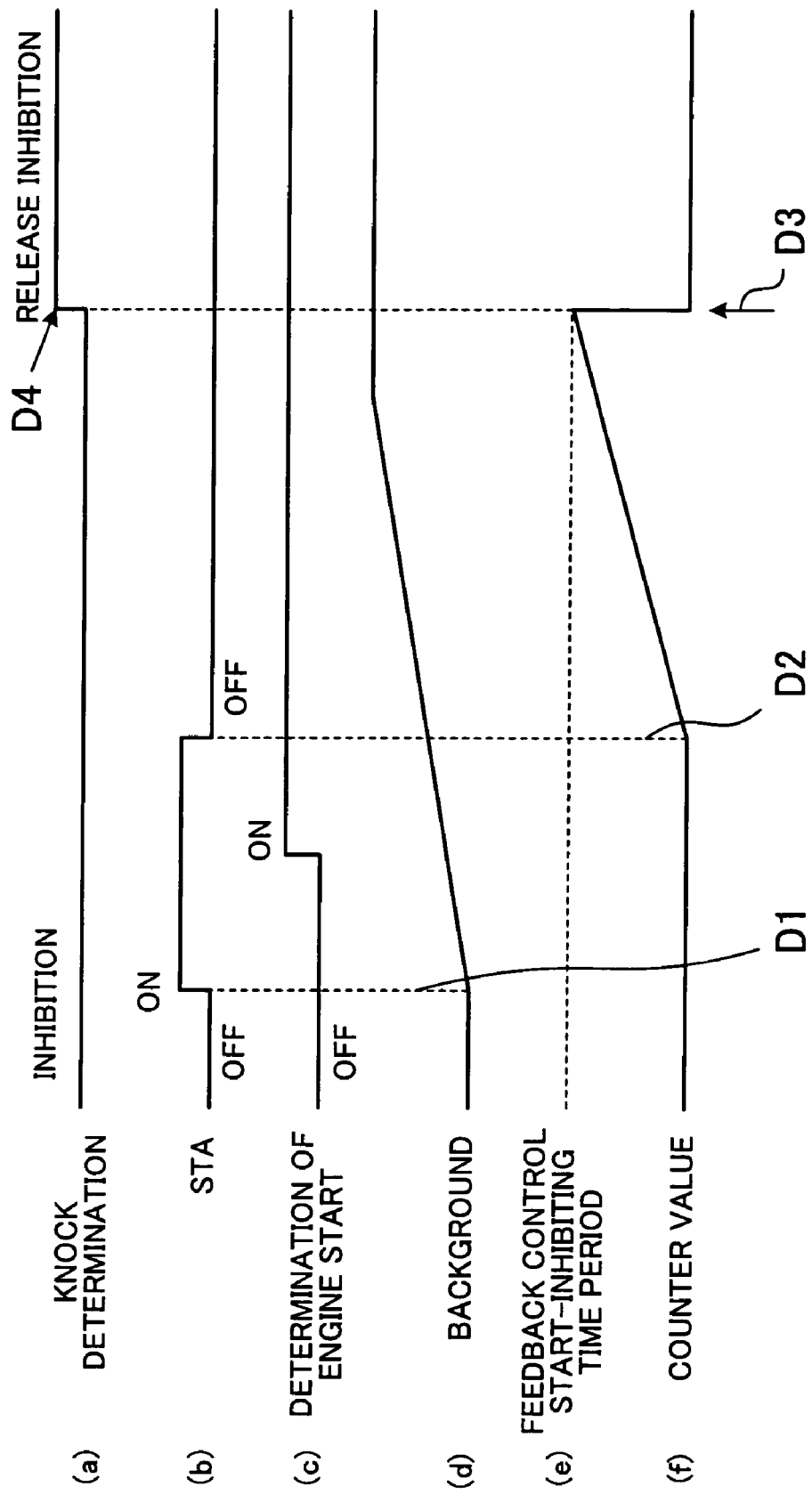
FIG. 14 is a control chart for calculating a feedback control start-inhibiting time period.

FIG. 14 is a control chart for calculating a feedback control start time. FIG. 14(a) illustrates a waveform showing timing in which knock determination starts to be executed. FIG. 14(b) illustrates a waveform showing ON/OFF timing of the starter. FIG. 14(c) illustrates a waveform showing timing in which the start of the engine is determined. FIG. 14(d) illustrates the waveform of the background. FIG. 14(e) shows count values calculated based on coolant temperature, oil temperature, and intake air temperature, for starting knock feedback control. FIG. 14(f) shows a counter value of a time counter that counts time. The third embodiment is distinguished from the first embodiment in that the counting of a time period to elapse before starting knock feedback control is started at a time point when the starter is switched from ON to OFF. The other configurations and functions of the third embodiment are similar to those of the first embodiment, and therefore detailed description thereof is omitted.

As shown by a broken line D1 in FIG. 14, when the starter is switched from OFF to ON, the CPU 11a starts calculation of the background. Since the background is obtained by averaging peak values, it progressively converges to a peak value with engine rotation as shown in FIG. 14(d). Further, the CPU 11a acquires engine coolant temperature, engine oil temperature, and engine intake air temperature from the respective associated sensors, and calculates time periods (count values) to elapse before starting knock feedback control, with reference to the coolant temperature table 41, the oil temperature table 42, and the intake air temperature table 43.

When the engine is determined to be started as shown in FIG. 14(c) and the starter is turned off as shown in FIG. 14(b), the counting of the time period to elapse before starting knock feedback control is started as shown in FIG. 14(f) (broken line D2 in FIG. 14).

When the counter value is counted up and reaches the count value for starting knock feedback control, as shown by an arrow D3, the CPU 11a starts knock feedback control as shown by an arrow D4. It should be noted that ignition timing is mechanically controlled until the engine is completely started, and hence it is not necessary to reflect a result of knock determination in the ignition timing control.

Next, the operation of the CPU 11a will be described using a flowchart.

Figure 15:
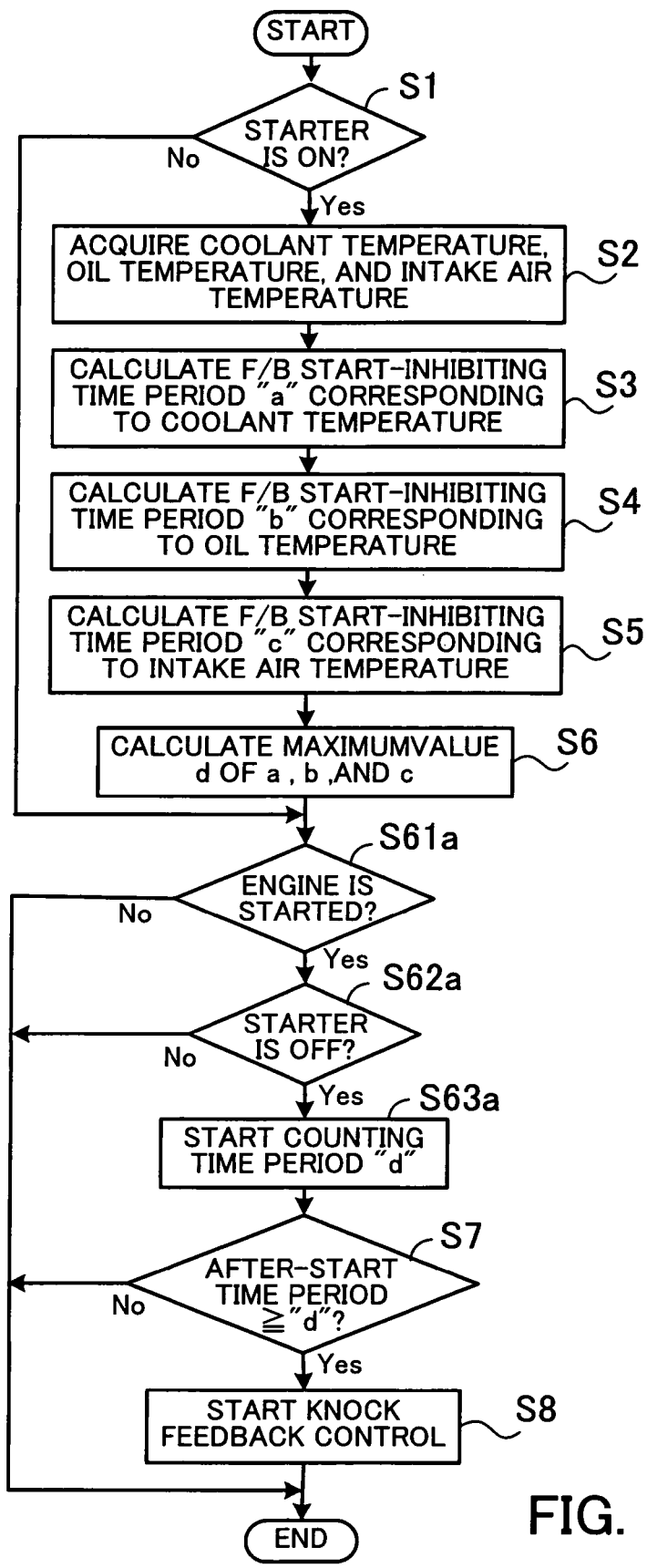
FIG. 15 is a flowchart showing a process for calculating the feedback control start-inhibiting time period.

FIG. 15 is a flowchart showing a process for calculating a feedback control start-inhibiting time period. Steps in FIG. 15 identical to those in FIG. 8 are designated by identical step numbers, and description thereof is omitted.

In steps S1 to S6, the CPU 11a calculates a time period (maximum value d) to elapse before starting knock feedback control, as described with reference to FIG. 8.

In step S61a, the CPU 11a determines whether or not the engine 33 has been started. If the engine 33 has not been started, the process is immediately terminated. On the other hand, if the engine 33 has been started, the process proceeds to step S62a.

In the step S62a, the CPU 11a determines whether or not the starter 34 has been turned off. If the starter has been turned off, the process proceeds to step S63a, whereas if the starter 34 is still on, the process is terminated.

In the step S63a, the CPU 11a starts counting of time to elapse before starting knock feedback control. In the step 7, as described with reference to FIG. 8, the CPU 11a determines whether or not a time period corresponding to the maximum value d has elapsed. If the time period has elapsed, the process proceeds to the step S8, wherein the CPU 11a starts knock feedback control.

As described above, the counting of the time period to elapse before starting knock feedback control is started after the engine having been started and the starter having been switched from ON to OFF. As a consequence, knock determination is executed after the starter is turned off, so that it is possible to reduce influence of noise due to cranking of the engine starting means 3, thereby preventing erroneous knock.

Next, a knock detection apparatus according to a fourth embodiment of the present invention will be described in detail with reference to drawings. As long as the starter is on, the engine is being cranked by the starter motor, and hence noise is liable to be produced, which can cause the background to assume an abnormal value. To eliminate this fear, according to the fourth embodiment, when the starter is switched from ON to OFF after the start of the engine, the calculation of the background is started, and the counting of a time period to elapse before starting knock feedback control is started.

Figure 16:
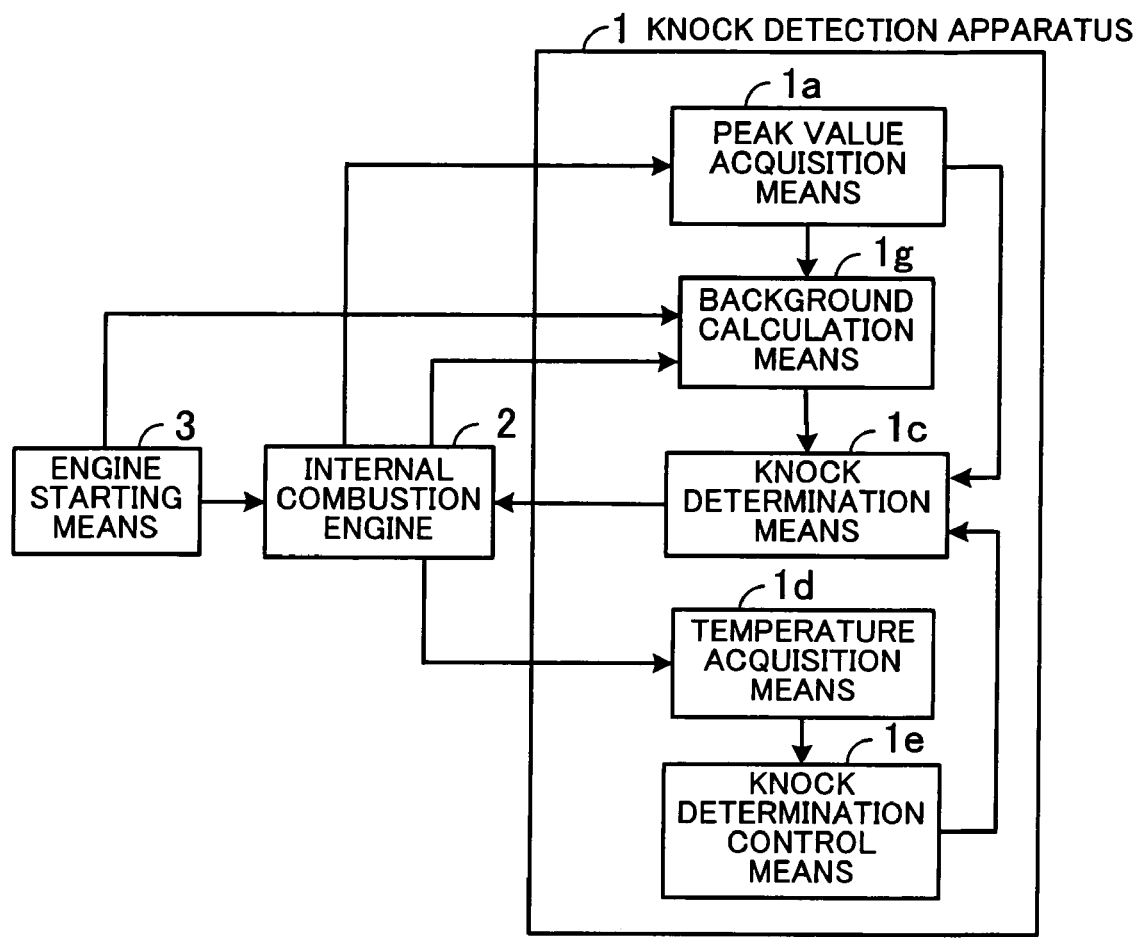
FIG. 16 is a diagram showing the outline of a knock detection apparatus, according to a fourth embodiment of the present invention.

FIG. 16 is a diagram showing the outline of the knock detection apparatus. FIG. 16 is distinguished from FIG. 1 in that a background calculation means 1g provided therein is partially different in function from the background calculation means 1g. Component elements in FIG. 16 identical or similar in function to those in FIG. 1 are designated by identical reference numerals, and description thereof is omitted.

The background calculation means 1g appearing in FIG. 16 receives from the engine 2 a signal indicative of whether or not the engine 2 has been started, and the ON and OFF signals from the engine starting means 3. When the signal indicative of the start of the engine 2 is input from the engine 2 and the OFF signal from the engine starting means 3, the background calculation means 1g starts calculation of the background. More specifically, after the engine 2 is started by the engine starting means 3 and the engine starting means 3 is turned off, the background calculation means 1g starts calculation of the background. It should be noted that the knock determination control means 1e inhibits operation of the knock determination means 1c until a predetermined time period calculated based on temperature of the engine 2 acquired by the temperature acquisition means 1d has elapsed.

As described above, the calculation of background is started after the engine starting means 3 is switched from ON to OFF after the start of the engine 2. This makes it possible to reduce influence of noise due to cranking of the engine starting means 3, thereby preventing erroneous knock determination.

Next, the operation of the knock detection apparatus according to the fourth embodiment will be described using a control chart. A block diagram of the configuration of the fourth embodiment is identical to FIG. 13, and therefore illustration thereof is omitted. However, the fourth embodiment is distinguished from the third embodiment in that when the OFF signal is output from the starter 34 after the start of the engine 33, the CPU 11a calculates the background.

Figure 17:
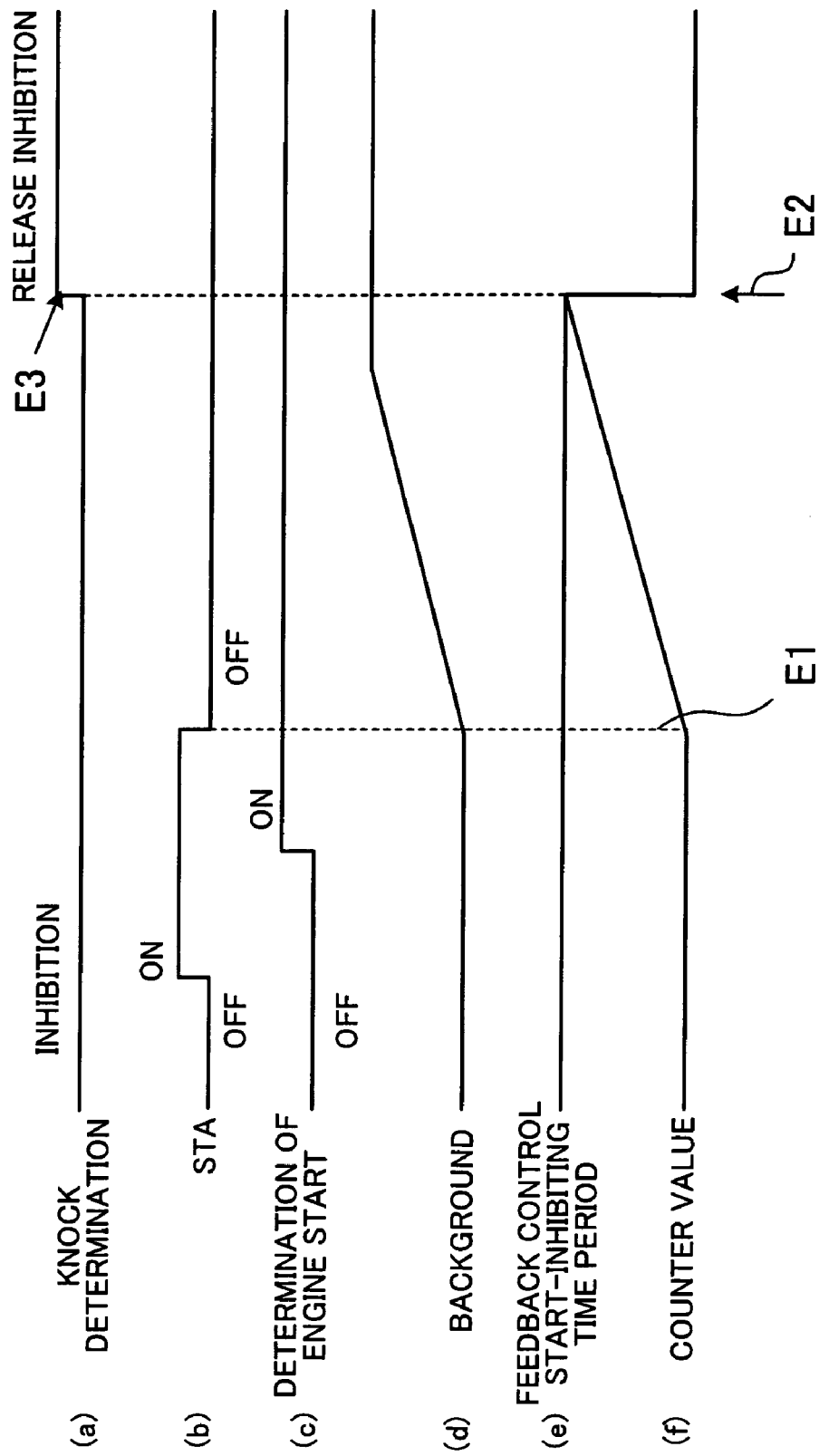
FIG. 17 is a control chart for calculating a feedback control start-inhibiting time period.

FIG. 17 is a control chart for calculating a feedback control start-inhibiting time period. FIG. 17(a) illustrates a waveform showing timing in which knock determination starts to be executed. FIG. 17(b) illustrates a waveform showing ON/OFF timing of the starter. FIG. 17(c) illustrates a waveform showing timing in which the engine is determined to be started. FIG. 17(d) illustrates the waveform of the background. FIG. 17(e) shows a count value calculated based on coolant temperature, oil temperature, and intake air temperature, for starting knock feedback control. FIG. 17(f) shows a counter value of a time counter that counts time. The fourth embodiment is distinguished from the third embodiment in that at a time point when the starter is switched from ON to OFF after the start of the engine, the calculation of background is started, and at the same time the counting of a time period to elapse before starting knock feedback control is started. The other configurations and functions of the fourth embodiment are similar to those of the third embodiment, and therefore detailed description thereof is omitted.

When the starter is turned on, the CPU 11a acquires engine coolant temperature, engine oil temperature, and engine intake air temperature from the respective associated sensors, and calculates time periods to elapse (count values to be counted) before starting knock feedback control, with reference to the coolant temperature table 41, the oil temperature table 42, and the intake air temperature table 43.

When the engine is determined to be started and the starter is turned off as shown in FIGS. 17(c) and 17(b), the CPU 11a starts calculation of the background (see a broken line E1 in FIG. 17). Since the background is obtained by averaging peak values, it progressively converges to a peak value after the start of the engine as shown in FIG. 17(d). Further, when the engine is determined to be started and the starter is turned off, the CPU 11 starts the counting the count value to be counted before starting knock feedback control, as shown in FIG. 17(f) (see a broken line E1 FIG. 17).

When the counter value is counted up and reaches the count value for starting knock feedback control, as shown by an arrow E2, the CPU 11a starts knock feedback control as shown by an arrow E3.

Next, the operation of the CPU 11a will be described using a flowchart.

Figure 18:
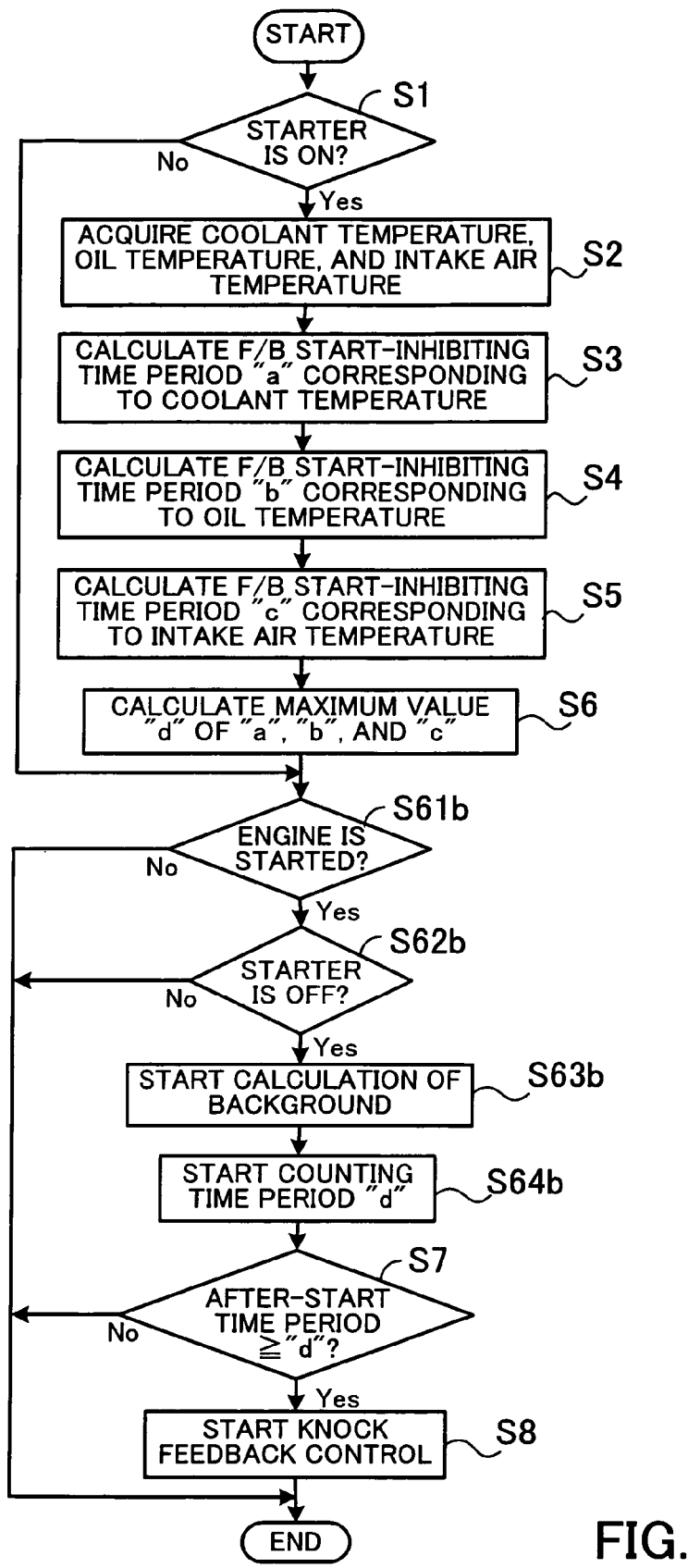
FIG. 18 is a flowchart showing a process for calculating the feedback control start-inhibiting time period.

FIG. 18 is a flowchart showing a process for calculating a feedback control start-inhibiting time period. Steps in FIG. 18 identical to those in FIG. 8 are designated by identical step numbers, and description thereof is omitted.

In the steps S1 to S6, the CPU 11a calculates a time period (maximum value d) to elapse before starting knock feedback control, as described with reference to FIG. 8.

In step S61b, the CPU 11a determines whether or not the engine 33 has been started. If the engine 33 has not been started, the process is immediately terminated. On the other hand, if the engine 33 has been started, the process proceeds to step S62b.

In the step S62b, the CPU 11a determines whether or not the starter 34 has been turned off. If the starter 34 has been turned off, the process proceeds to step S63b, whereas if the starter is still on, the process is terminated.

In the step S63b, the CPU 11a starts calculation of the background. In step S64b, the CPU 11a starts counting of the time period to elapse before starting knock feedback control. In the step 7, as described with reference to FIG. 8, the CPU 11a determines whether or not a time period corresponding to the maximum value d has elapsed. If the time period has elapsed, the process proceeds to the step S8, wherein the CPU 11a starts knock feedback control.

As described above, the calculation of the background and the counting of the time period to elapse before starting knock feedback control is started after the starter has been switched from ON to OFF after the start of the engine. This makes it possible to reduce influence of noise on the background due to cranking of the motor during the cranking or starting of the engine, thereby preventing erroneous knock determination.

Next, a knock detection apparatus according to a fifth embodiment of the present invention will be described in detail with reference to drawings. In the fifth embodiment, a result of knock determination is not allowed to be used for controlling the ignition timing of the engine until a predetermined time period calculated based on engine temperature has elapsed.

Figure 19:
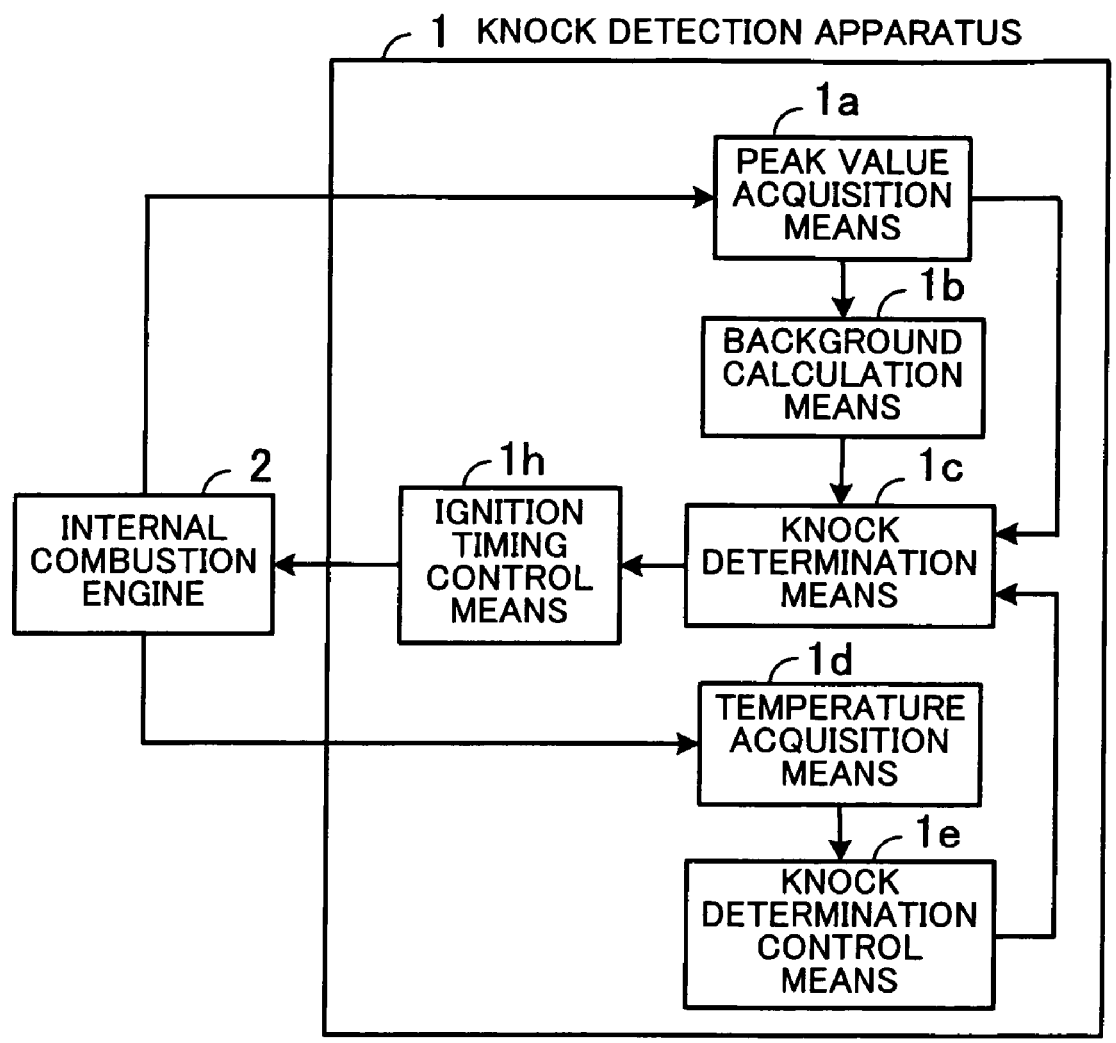
FIG. 19 is a diagram showing the outline of a knock detection apparatus, according to a fifth embodiment of the present invention.

FIG. 19 is a diagram showing the outline of the knock detection apparatus. FIG. 19 is distinguished from FIG. 1 in that an ignition timing control means 1h is shown. Component elements in FIG. 19 identical or similar in function to those in FIG. 1 are designated by identical reference numerals, and description thereof is omitted.

As described hereinabove with reference to FIG. 1, the knock determination means 1c performs knock determination based on the peak value and the background, and controls advance and retardation of the ignition timing of the internal combustion engine 2 based on a result of the knock determination. The ignition timing control means 1h advances and retards the ignition timing of the engine 2 in accordance with the control executed by the knock determination means 1c for advance and retardation of the ignition timing.

As described hereinabove with reference to FIG. 1, the knock determination control means 1e inhibits operation of the knock determination means $1c$ until a predetermined time period calculated based on temperature of the engine 2 has elapsed. In other words, a result of knock determination by the knock determination means $1c$ is not reflected in the control of the ignition timing until the predetermined time period based on the temperature of the engine 2 has elapsed.

Next, the operation of the knock detection apparatus according to the fifth embodiment will be described using a flowchart. A block diagram of the configuration of the fifth embodiment is identical to FIG. 13, and therefore illustration thereof is omitted. However, in the fifth embodiment, the CPU 11$a$ does not reflect a result of knock determination in ignition timing control until a predetermined time period calculated based on temperature of the engine 33 has elapsed.

Figure 20:
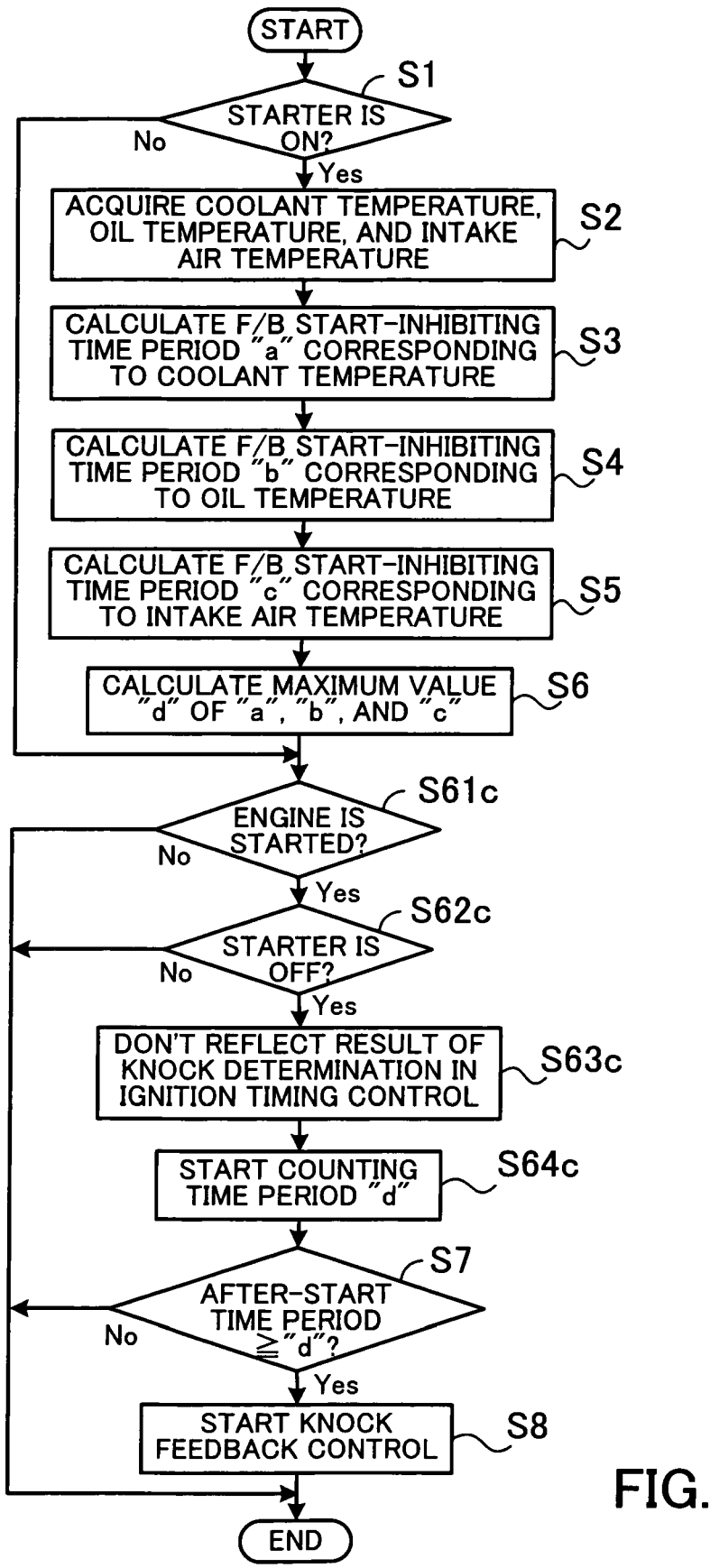
FIG. 20 is a flowchart showing a process for calculating a feedback control start-inhibiting time period.

FIG. 20 is a flowchart showing a process for calculating a feedback control start-inhibiting time period. Steps in FIG. 20 identical to those in FIG. 8 are designated by identical step numbers, and description thereof is omitted.

In the steps S1 to S6, the CPU 11$a$ calculates a time period (maximum value d) to elapse before starting knock feedback control, as described hereinabove with reference to FIG. 8.

In step S61$c$, the CPU 11$a$ determines whether or not the engine 33 has been started. If the engine 33 has not been started, the process is immediately terminated. On the other hand, if the engine 33 has been started, the process proceeds to step S62$c$.

In the step S62$c$, the CPU 11$a$ determines whether or not the starter 34 has been turned off. If the starter 34 has been turned off, the process proceeds to step S63$c$, whereas if the starter is still on, the process is terminated. In the step S63$c$, the CPU 11$a$ does not reflect a result of knock determination in ignition timing control.

In step S64$c$, the CPU 11$a$ starts the counting of the time period to elapse before starting knock feedback control. In the step 7, as described with reference to FIG. 8, the CPU 11$a$ determines whether or not a time period corresponding to the maximum value d has elapsed. If the time period has elapsed, the process proceeds to the step S8, wherein the CPU 11$a$ reflects a result of knock determination in ignition timing control.

By configuring the process, as described above, such that a result of knock determination by the knock determination means $1c$ is not reflected in ignition timing control until the predetermined time period calculated based on the temperature of the engine 33 has elapsed, it is also possible to expand the knock control range.

Next, a knock detection apparatus according to a sixth embodiment of the present invention will be described in detail with reference to drawings. First, the principles of the knock detection apparatus will be explained.

Figure 21:
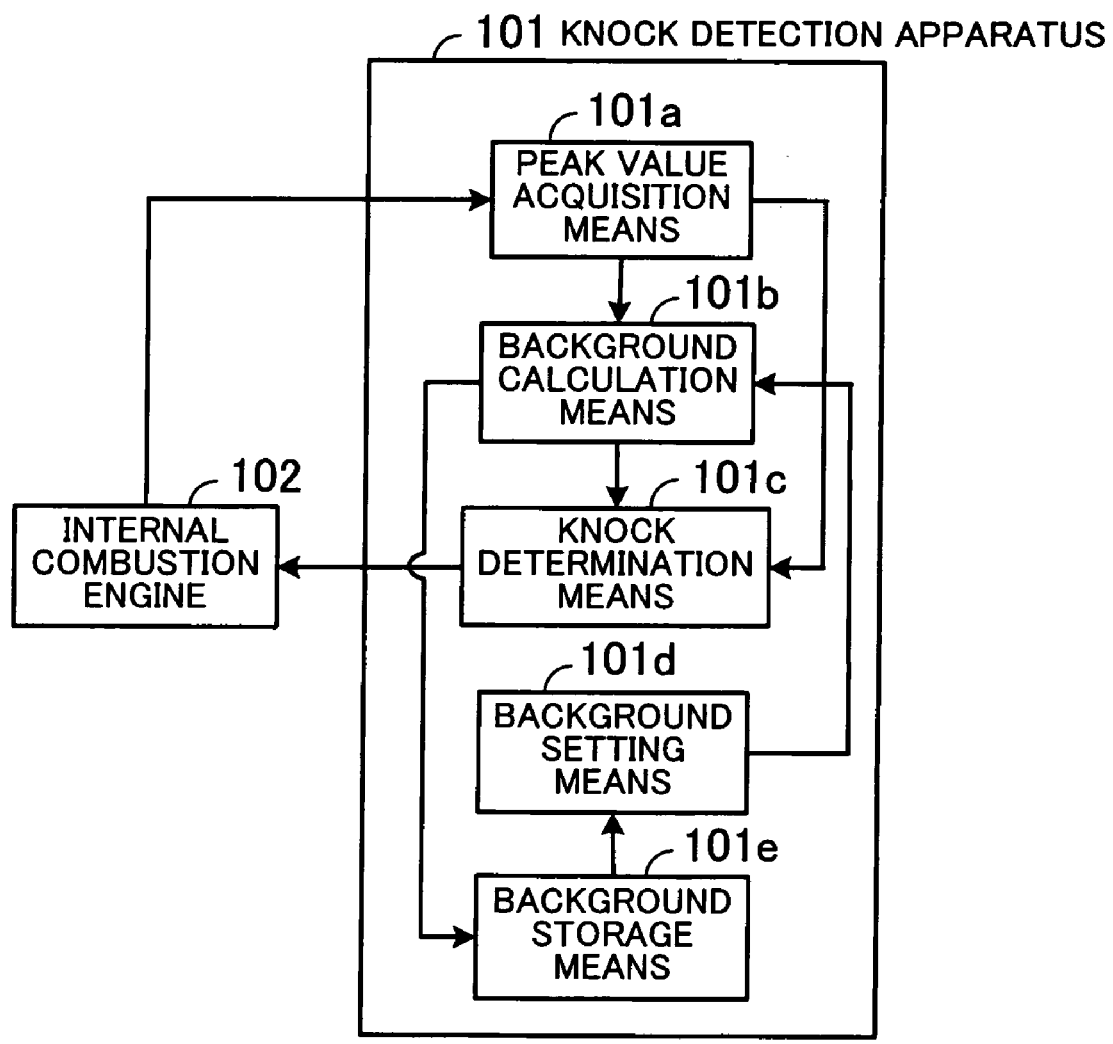
FIG. 21 is a diagram showing the outline of a knock detection apparatus, according to a sixth embodiment of the present invention.

FIG. 21 is a diagram showing the outline of the knock detection apparatus. As shown in FIG. 21, the knock detection apparatus 101 is comprised of a peak value acquisition means 101$a$, a background calculation means 101$b$, a knock determination means 101$c$, a background setting means 101$d$, and a background storage means 101$e$. The knock detection apparatus 101 performs knock feedback control by controlling the ignition timing of an internal combustion engine 102.

The peak value acquisition means 101$a$ acquires a peak value (knock signal) indicative of vibration of the engine 102 during a predetermined period of a rotation cycle of a crankshaft of the engine 102. For example, a knock sensor for detecting vibration is fixed to the engine 102, and the peak value acquisition means 101$a$ acquires the peak value indicative of vibration of the engine 2 from the knock sensor.

The background calculation means 101$b$ averages peak values acquired by the peak value acquisition means 101$a$, to thereby calculate a background (threshold value). More specifically, a value obtained by subtracting the immediately preceding background calculated on the immediately preceding occasion from the currently acquired peak value is multiplied by a predetermined coefficient, and a value obtained by the multiplication is added to the immediately preceding background, whereby the current background is determined. The addend value (updating value) may be provided with an update guard value, for example.

The knock determination means 101$c$ performs knock determination based on whether the peak value acquired by the peak value acquisition means 101$a$ is higher than a predetermined level above the background. Then, knock in the engine 2 is feedback controlled based on the knock determination. For example, if the peak value is not higher than the predetermined level above the background, it is determined that knock has not occurred, and the ignition timing of the engine 2 is progressively advanced. On the other hand, if the peak value is higher than the predetermined level above the background, it is determined that knock has occurred, and the ignition timing of the engine 2 is retarded.

The background setting means 101$d$ sets a background stored by the background storage means 101$e$ during the immediately preceding operation of the engine 102, as the immediately preceding background for use in calculating the current background during the start of the engine 102. In short, during the start of the engine, the immediately preceding background is set to the background calculate and stored during the immediately preceding operation of the engine 102, whereby the current background is calculated.

The background storage means 101$e$ stores in a storage device a background calculated by the background setting means 101$d$ during the operation of the engine 102.

In the present embodiment, since the immediately preceding background to be used by the background calculation means 101$b$ for calculating the current background during the start of the engine 102 is set to a background stored during the immediately preceding operation of the engine 102, it is possible to enhance the convergence of the background during the start of the engine.

Next, the knock detection apparatus according to the sixth embodiment will be described in detail with reference to drawings.

Figure 22:
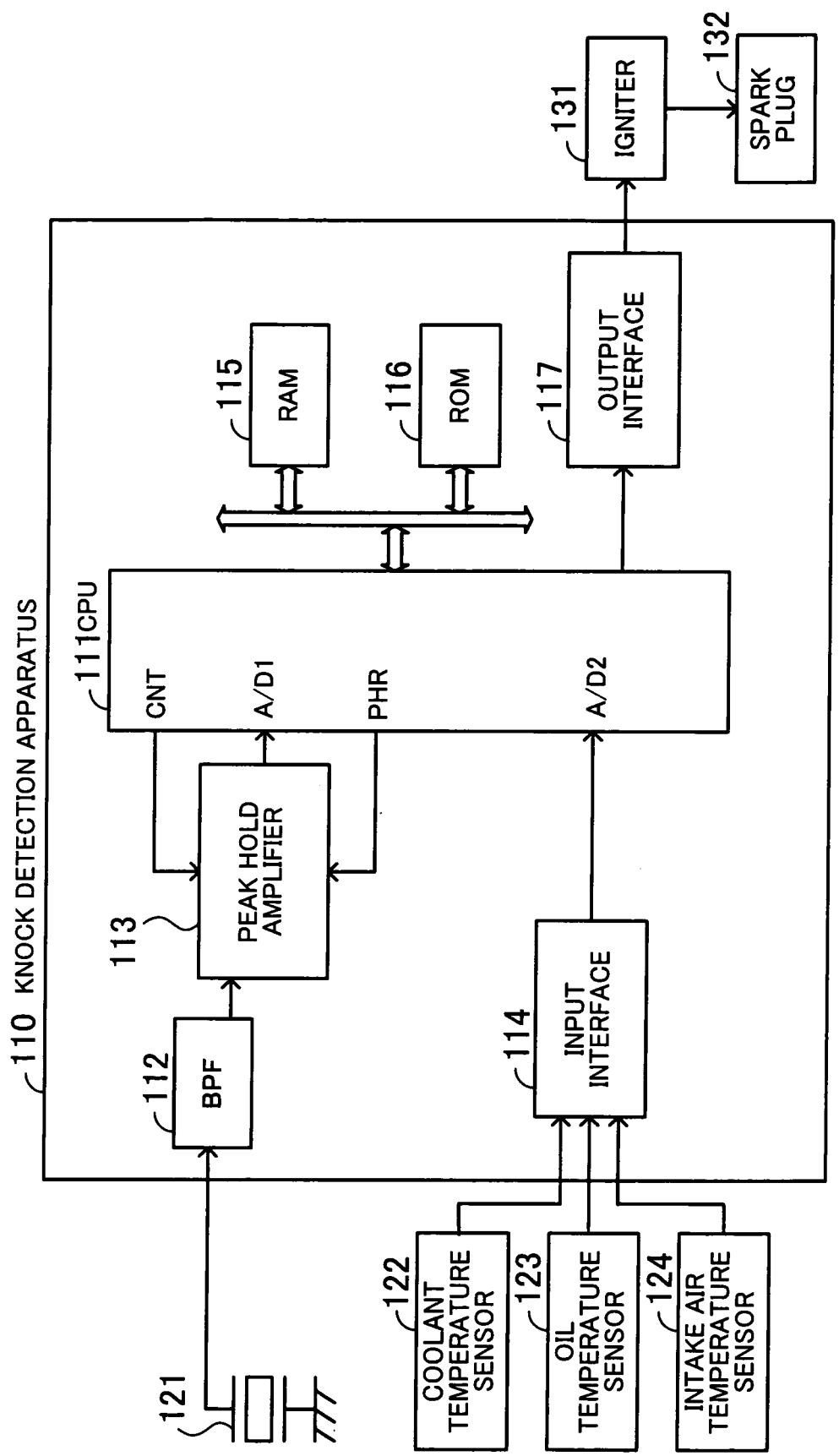
FIG. 22 is a block diagram of the configuration of the knock detection apparatus.

FIG. 22 is a block diagram of the configuration of the knock detection apparatus. As shown in FIG. 22, the knock detection apparatus 110 is comprised of a CPU 111, a BPF 112, a peak hold amplifier 113, an input interface 114, a RAM 115, a ROM 116, and an output interface 117. The knock detection apparatus 110 is connected to a knock sensor 121, a coolant temperature sensor 122, an oil temperature sensor 123, and an intake air temperature sensor 124. Further, an igniter 131 connected to each spark plug 132 is connected to the knock detection apparatus 110.

The knock sensor 121 is a vibration sensor for converting engine vibration into an electric signal. The knock sensor 121 is formed e.g. by a piezoelectric element and is fixed to an engine cylinder block or the like.

An electric signal output from the knock sensor 121 is input to the BPF 112. The BPF 112 filters the electric signal to thereby obtain only a signal i.e. a component of the electric signal in a frequency band from which a nock signal can appear. The BPF 112 has a center frequency of 4 kH and a bandwidth of 1 to 100 kH, for example.

The signal obtained by filtration by the BPF 112 is input to the peak hold amplifier 113. Further, a gate control signal output from a control (CNT) terminal of the CPU 111, and a peak hold reset signal output from a peak hold reset (PHR) terminal of the CPU 111 are input to the peak hold amplifier 113. As long as the gate control signal is output from the CNT terminal of the CPU 111, the peak hold amplifier 113 holds the peak value of a signal output from the BPF 112, while updating the same. Then, when the peak hold reset signal is output from the PHR terminal of the CPU 111, the peak hold amplifier 113 resets the held peak value. The held peak value is input to an analog-to-digital (A/D) conversion terminal A/D1 of the CPU 111.

The coolant temperature sensor 122, the oil temperature sensor 123, and the intake air temperature sensor 124 convert coolant temperature, oil temperature, and intake air temperature of the engine into respective electric signals, to output the signals. The signals from the coolant temperature sensor 122, the oil temperature sensor 123, and the intake air temperature sensor 124 are input to an analog-to-digital (A/D) conversion terminal A/D2 of the CPU 111 via the input interface 114.

The RAM 115 and the ROM 116 are connected to the CPU 111 via a bus. The RAM 115 temporarily stores at least part of an OS (Operating System) executed by the CPU 101 and application programs for performing knock feedback control. The RAM 115 also stores various data necessitated in processing by the CPU 111. The ROM 116 stores the OS, the application programs, and various data. It should be noted that the RAM 115 and the ROM 116 may be incorporated in the CPU 111. Further, the ROM 116 may be replaced by a rewritable flash memory or the like.

The igniter 131 connected to the spark plug 132 is connected to the CPU 111 via the output interface 117. The igniter 131 drivingly controls the ignition timing of the spark plug 132 in response to an instruction from the CPU 111.

The CPU 111 performs analog-to-digital conversion of the peak value input to the A/D conversion terminal A/D1, and determines whether or not engine knock has occurred. Then, the CPU 111 feedback controls the ignition timing of the spark plug 132 based on the result of the determination. More specifically, if it is determined that knock has not occurred, the CPU 111 performs knock feedback control such that the ignition timing of the spark plug 132 is progressively advanced, whereas if it is determined that knock has occurred, the CPU 111 performs knock feedback control such that the ignition timing of the spark plug 132 is retarded.

The CPU 111 calculates a cylinder-by-cylinder background as a moving average value, in association with each of engine coolant temperature, engine intake air temperature, and engine oil temperature during operation of the engine, and learns (stores) the moving average values. When the engine is started next time, the backgrounds learned based on the respective engine coolant temperature, engine intake air temperature, and engine oil temperature during the immediately preceding operation of the engine are used to calculate the current background. This enables the background to quickly converge to an appropriate value. It should be noted that background learning is performed e.g. by the backed-up RAM 115 or a storage device, such as a flash memory, for maintaining storage.

Next, a description will be given of knock feedback control.

Figure 23:
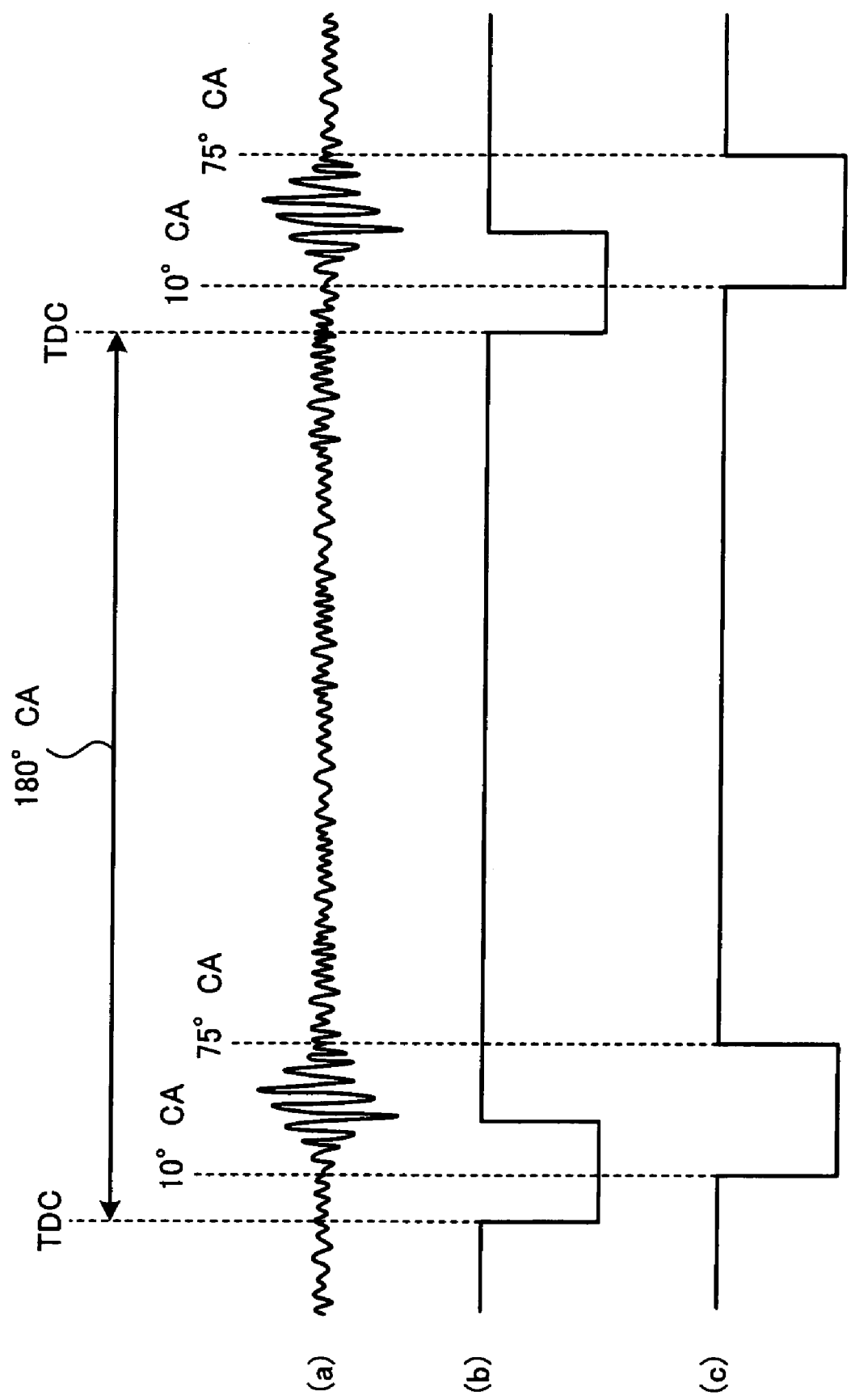
FIG. 23 is a diagram showing waveforms useful in explaining knock determination.

FIG. 23 is a diagram showing waveforms useful in explaining knock determination. FIG. 23(*a*) shows the waveform of a signal input to the peak hold amplifier 113. FIG. 23(*b*) shows the waveform of a signal output from a crank angle sensor, not shown in FIG. 22, of the engine. A pulse is output from the crank angle sensor whenever a piston of each cylinder reaches the TDC position immediately before starting an explosion stroke. In a four-cylinder four-cycle engine, for example, the pulse is output whenever the crankshaft rotates through 180 degrees (i.e. at each 180° CA (crank angle)), as shown in FIG. 23(*b*). FIG. 23(*c*) shows the waveform of the gate control signal output from the CNT terminal of the CPU 111.

The peak hold amplifier 113 updates the peak value of a signal output from the BPF 112 and holds the updated peak value during a knock observation period set to a range from 10° CA to 75° CA by the gate control signal output from the CPU 111. The peak value held by the peak hold amplifier 113 is input to the A/D1 terminal of the CPU 111. The peak value held by the peak hold amplifier 113 is reset by the peak hold reset signal output from the PHR terminal of the CPU 111.

The CPU 111 calculates a background based on the A/D converted peak value. The background is calculated e.g. by the aforementioned equation (1):

$$BG = \text{immediately preceding } BG + (\text{current peak value} - \text{immediately preceding } BG) \times (1/\text{averaging value}) \quad (1)$$

wherein BG represents a background, and the averaging value is larger than 1. It should be noted that an update guard value may be set so as to prevent a change in the background from exceeding a predetermined amount.

As is apparent from the equation (1), the background is obtained by averaging peak values. The CPU 111 determines whether or not the currently A/D converted peak value is higher than a predetermined level above the background obtained by the equation (1), to thereby perform determination as to whether knock has occurred. Whether or not knock has occurred is determined e.g. by the following equation (2):

$$Y = BG \times K \quad (2)$$

wherein K represents a value changed according to the rotational speed and load of the engine.

When the currently A/D converted peak value is larger than the value Y obtained by multiplying the background by K, it is determined that knock has occurred. Then, feedback control is performed so as to retard the ignition timing of the spark plug 132 which has been progressively advanced. Knock feedback control is thus performed.

Next, a description will be given of convergence of the background during the start of the engine.

Figure 24:
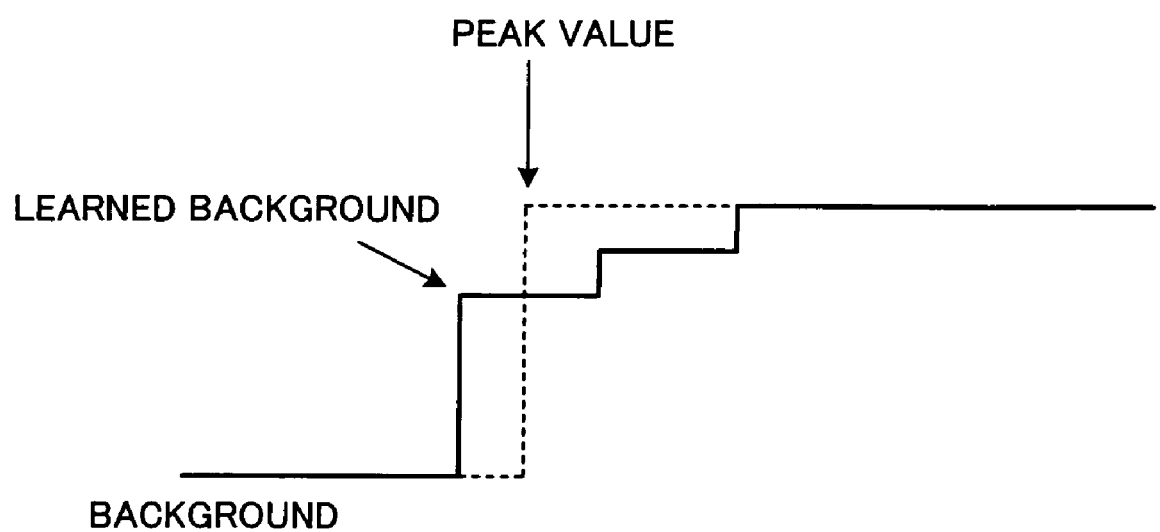
FIG. 24 is a diagram useful in explaining convergence of the background during the start of an engine.
Figure 34:
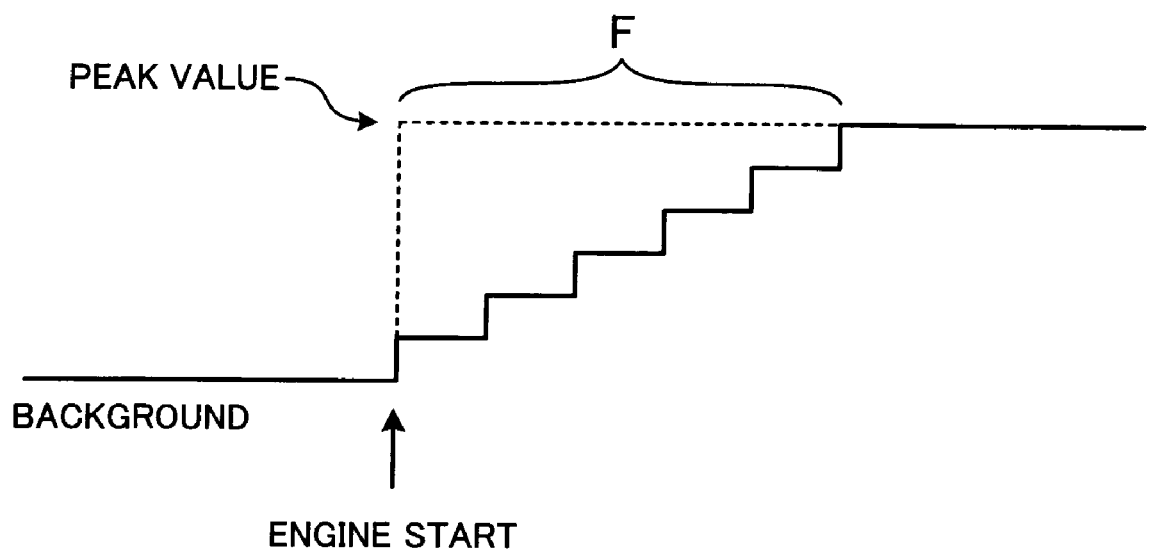
FIG. 34 is a diagram useful in explaining convergence of the background during the start of an engine, according to the prior art.

FIG. 24 is a diagram useful in explaining convergence of the background during the start of the engine. In FIG. 24, there are shown a background and a peak value. When the engine is started, the CPU 111 sets the immediately preceding BG shown in the equation (1) to a background learned during the immediately preceding operation of the engine. As a consequence, quick convergence of the background to the peak value can be achieved. As is apparent from comparison between FIG. 24 and FIG. 34, the difference between the peak value and the background at the start of the engine is smaller in FIG. 24 than in FIG. 34, which results in quick convergence of the background to the peak value.

Next, background learning tables will be explained. Backgrounds are learned in association with predetermined values of each of engine coolant temperature, engine intake air temperature, and engine oil temperature in each cylinder of the engine.

FIG. 25 is a diagram showing an example of a coolant temperature-based background learning table. The coolant temperature-based background learning table 141 shown in FIG. 25 is realized e.g. by the aforementioned storage device which is capable of maintaining storage. A coolant temperature-based learned value field [A1] of the coolant temperature-based background learning table 141 stores a background calculated when the engine coolant temperature is below 0° C. A coolant temperature-based learned value field [A2] stores a background calculated at an engine coolant temperature not lower than 0° C. and lower 30° C. A coolant temperature-based learned value field [A3] stores a background calculated at an engine coolant temperature not lower than 30° C. and lower 60° C. A coolant temperature-based learned value field [A4] stores a background calculated at an engine coolant temperature not lower than 60° C. and lower 90° C. A coolant temperature-based learned value field [A5] stores a background calculated at an engine coolant temperature not lower than 90° C.

FIG. 26 is a diagram showing an example of an intake air temperature-based background learning table. The intake air temperature-based background learning table 142 shown in FIG. 26 is realized e.g. by the aforementioned storage device which is capable of maintaining storage. Similarly to the learned value fields [A1] to [A5] of the coolant temperature-based background learning table 141 described with reference to FIG. 25, intake air temperature-based learned value fields [B1] to [B5] of the background learning table 142 store backgrounds calculated within the respective temperature ranges.

FIG. 27 is a diagram showing an example of an oil temperature-based background learning table. The oil temperature-based background learning table 143 shown in FIG. 27 is realized e.g. by the aforementioned storage device which is capable of maintaining storage. Similarly to the learned value fields [A1] to [A5] of the coolant temperature-based background learning table 141 described with reference to FIG. 25, oil temperature-based learned value fields [C1] to [C5] of the background learning table 143 store backgrounds calculated within the respective temperature ranges.

Next, a description will be given of learning of the background. The background is obtained as a moving average value. The learning of the background is performed only when the difference between the background and a peak value is not larger than a predetermined value. The learning of the background is performed on a cylinder-by-cylinder basis and in association with each of the engine coolant temperature, engine intake air temperature, and engine oil temperature.

Figure 28:
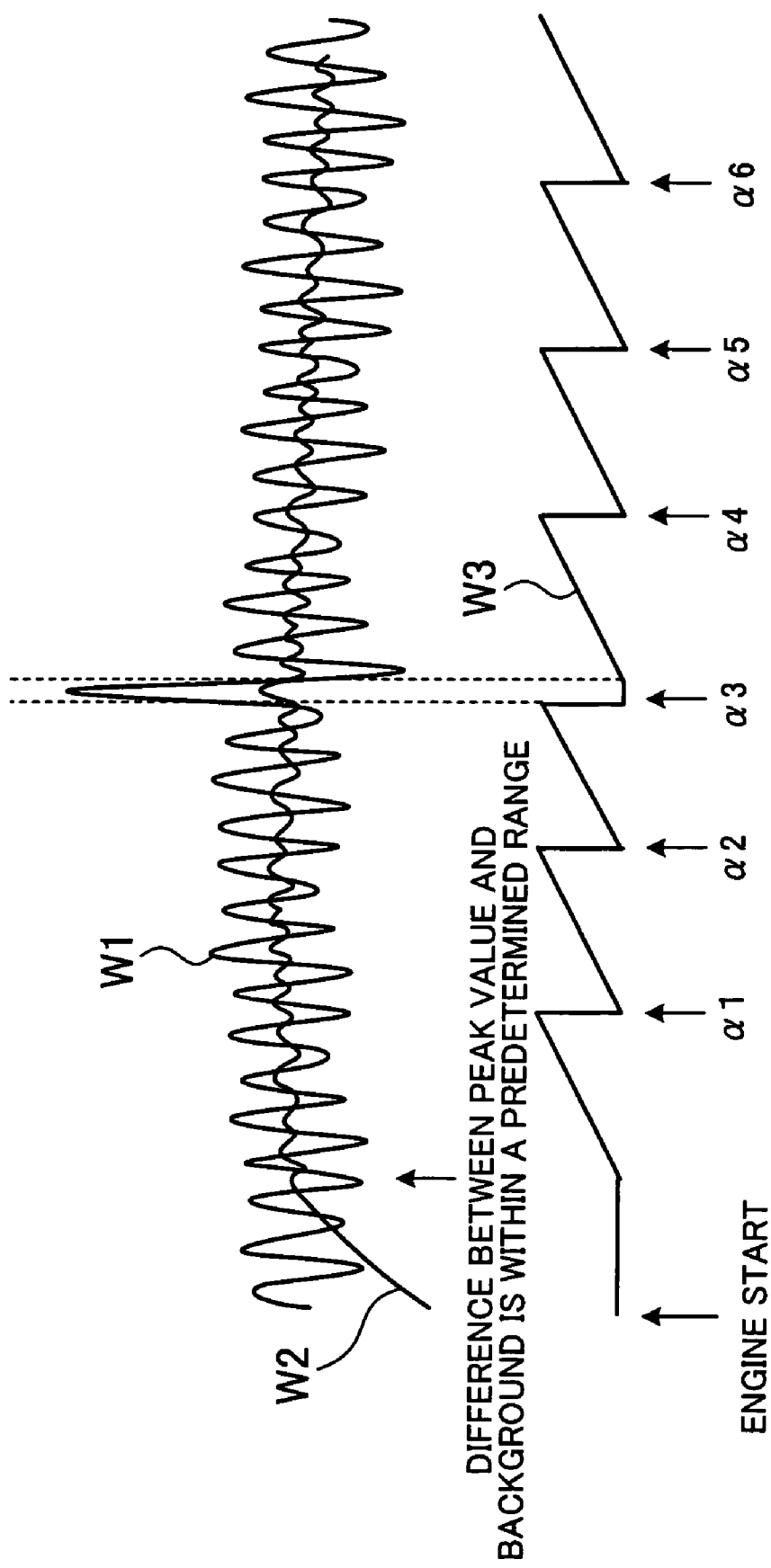
FIG. 28 is a diagram useful in explaining learning of the background.

FIG. 28 is a diagram useful in explaining learning of the background. In FIG. 28, W1 represents the waveform of a peak value, W2 the waveform of a background, and W3 the waveform of a counter value.

The background obtained by averaging sampled peak values progressively converges to the peak value after starting the engine. When the difference between the peak value and the background becomes equal to or smaller than a predetermined value, processing for The learning of the background is started.

The CPU 111 causes a counter to operate as shown by the waveform W3, and acquires a background when the counter value reaches a predetermined value. For example, the CPU 111 acquires backgrounds at respective time points $\alpha 1$, $\alpha 2$, $\alpha 4$, $\alpha 5$, $\alpha 6$, . . . Whenever a background is acquired, the CPU 111 resets the counter value. It should be noted that background acquisition is not performed at a time point $\alpha 3$, which will be described in detail hereinafter.

When having acquired several backgrounds, the CPU 111 calculates the moving average value of the backgrounds. In the engine coolant temperature-based background learning, moving average values of backgrounds are sequentially stored in the coolant temperature-based background learning table 141. If the same coolant temperature continues, an associated moving average value is continuously overwritten. Similarly, in the engine intake air temperature-based background learning and the engine oil temperature-based background learning, moving average values of backgrounds are sequentially stored in the intake air temperature-based background learning table 142 and the oil temperature-based background learning table 143, respectively.

The CPU 111 performs the learning of the background (writing of backgrounds in the tables) only when the difference between the background and the peak value is not larger than the predetermined value. More specifically, when the peak value assumes a large value due to knock and the difference between the background and the peak value becomes equal to or larger than the predetermined value, background acquisition and calculation of a moving average value are not performed. For example, background acquisition is not performed at the time point $\alpha 3$. In short, the moving average values of backgrounds acquired in the normal state are calculated and learned. When the difference between the background and the peak value becomes equal to or larger than the predetermined value, the counter value is reset to 0, and a moving average value is calculated from the start.

Next, the operation of the CPU 111 will be described using a flowchart.

Figure 29:
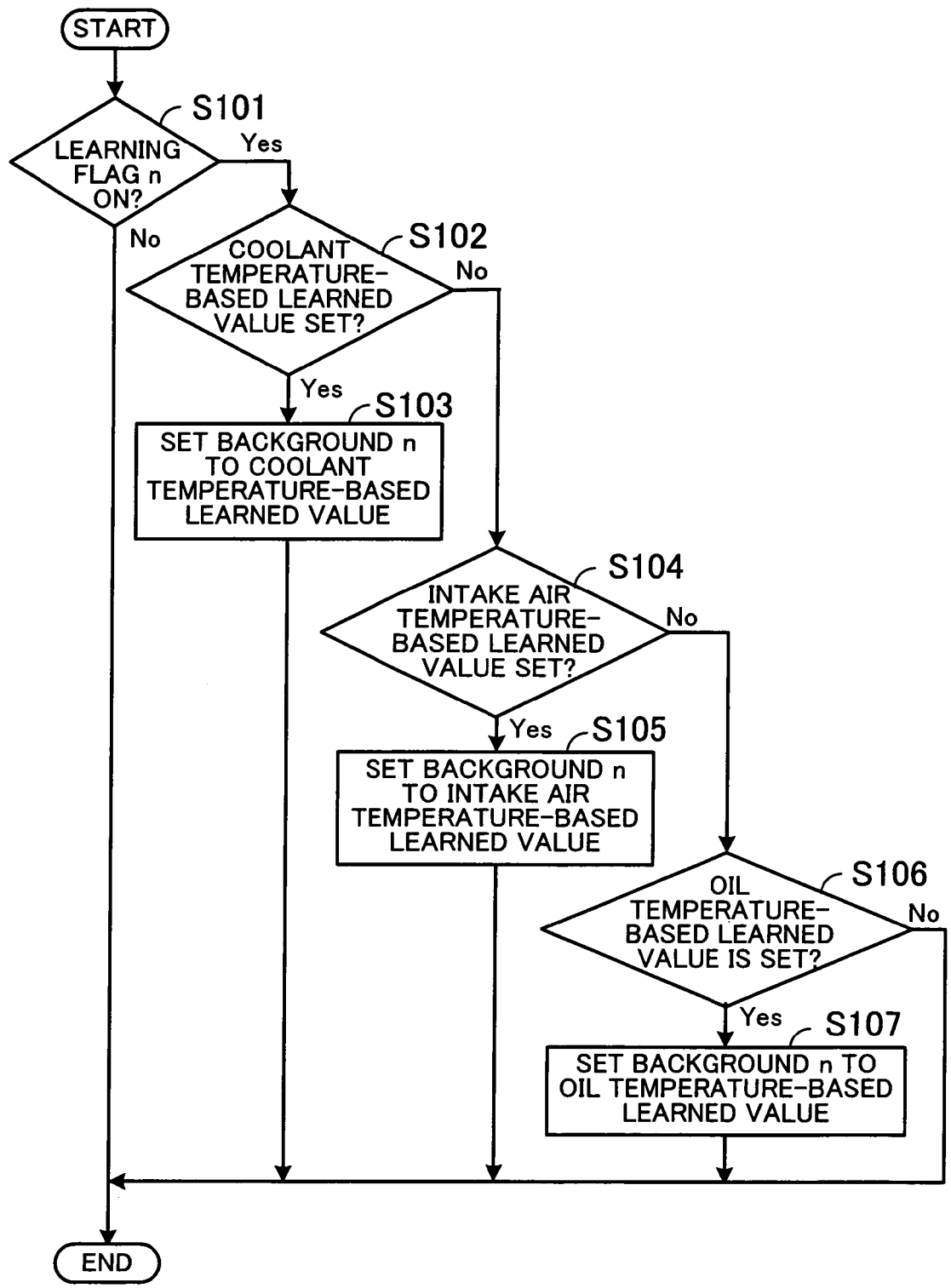
FIG. 29 is a flowchart showing a process for setting a learned value of the background.

FIG. 29 is a flowchart showing a process for background setting. The CPU 111 executes the process e.g. in an initial routine, following steps described below. It should be noted that a symbol "n" in the flowchart represents the number of engine cylinders, and each of steps with "n" is executed on a cylinder-by-cylinder basis.

In step S101, the CPU 111 determines whether or not a learning flag is ON. If the learning flag is ON, the process proceeds to step S102, whereas if the learning flag is not ON, the process is immediately terminated.

In the step S102, the CPU 111 determines whether or not the immediately preceding BG shown by the equation (1) should be set to a coolant temperature-based learned value (background learned based on coolant temperature) at the start of the engine. This determination is performed e.g. based on a program configuration setting whether or not a coolant temperature-based learned value should be used. If it is determined that the immediately preceding BG should be set to a coolant temperature-based learned value, the process proceeds to step S103, wherein the CPU 111 detects a current engine coolant temperature by the coolant temperature sensor 122, and acquires a coolant temperature-based learned value corresponding to the detected coolant temperature with reference to the coolant temperature-based background learning table 141 shown in FIG. 25. Then, the immediately preceding BG is set to the acquired coolant temperature-based learned value. As a consequence, quick convergence of the background to an appropriate peak value can be achieved. On the other hand, if it is determined in the step S102 that the immediately preceding BG should not be set to a coolant temperature-based learned value, the process proceeds to step S104.

In the step S104, the CPU 111 determines whether or not the immediately preceding BG shown by the equation (1)

should be set to an intake air temperature-based learned value (background learned based on intake air temperature) at the start of the engine. This determination is performed e.g. based on a program configuration as to whether or not an intake air temperature-based learned value should be used. If it is determined that the immediately preceding BG should be set to an intake air temperature-based learned value, the process proceeds to step S105, wherein the CPU 111 detects a current engine intake air temperature by the intake air temperature sensor 124, and acquires an intake air temperature-based learned value corresponding to the detected intake air temperature with reference to the intake air temperature-based background learning table 142 shown in FIG. 26. Then, the immediately preceding BG is set to the acquired intake air temperature-based learned value. As a consequence, quick convergence of the background to an appropriate peak value can be achieved. On the other hand, if it is determined in the step S104 that the immediately preceding BG should not be set to an intake air temperature-based learned value, the process proceeds to step S106.

In the step S106, the CPU 111 determines whether or not the immediately preceding BG shown by the equation (1) should be set to an oil temperature-based learned value (background learned based on oil temperature) at the start of the engine. This determination is performed e.g. based on a program configuration setting whether or not an oil temperature-based learned value should be used. If it is determined that the immediately preceding BG should be set to an oil temperature-based learned value, the process proceeds to step S107, wherein the CPU 111 detects a current engine oil temperature by the oil temperature sensor 123, and acquires an oil temperature-based learned value corresponding to the detected oil temperature with reference to the oil temperature-based background learning table 143 shown in FIG. 27. Then, the immediately preceding BG is set to the acquired oil temperature-based learned value. As a consequence, quick convergence of the background to an appropriate peak value can be achieved. It should be noted that the maximum value of all of the coolant temperature-based learned value, the intake air temperature-based learned value, and the oil temperature-based learned value may be calculated without determining in each of the steps S102, S104, and S106, whether the associated learned value is to be used, and then may be set to the immediately preceding BG shown by the equation (1).

Next, a description will be given of a process for learning the background.

Figure 30:
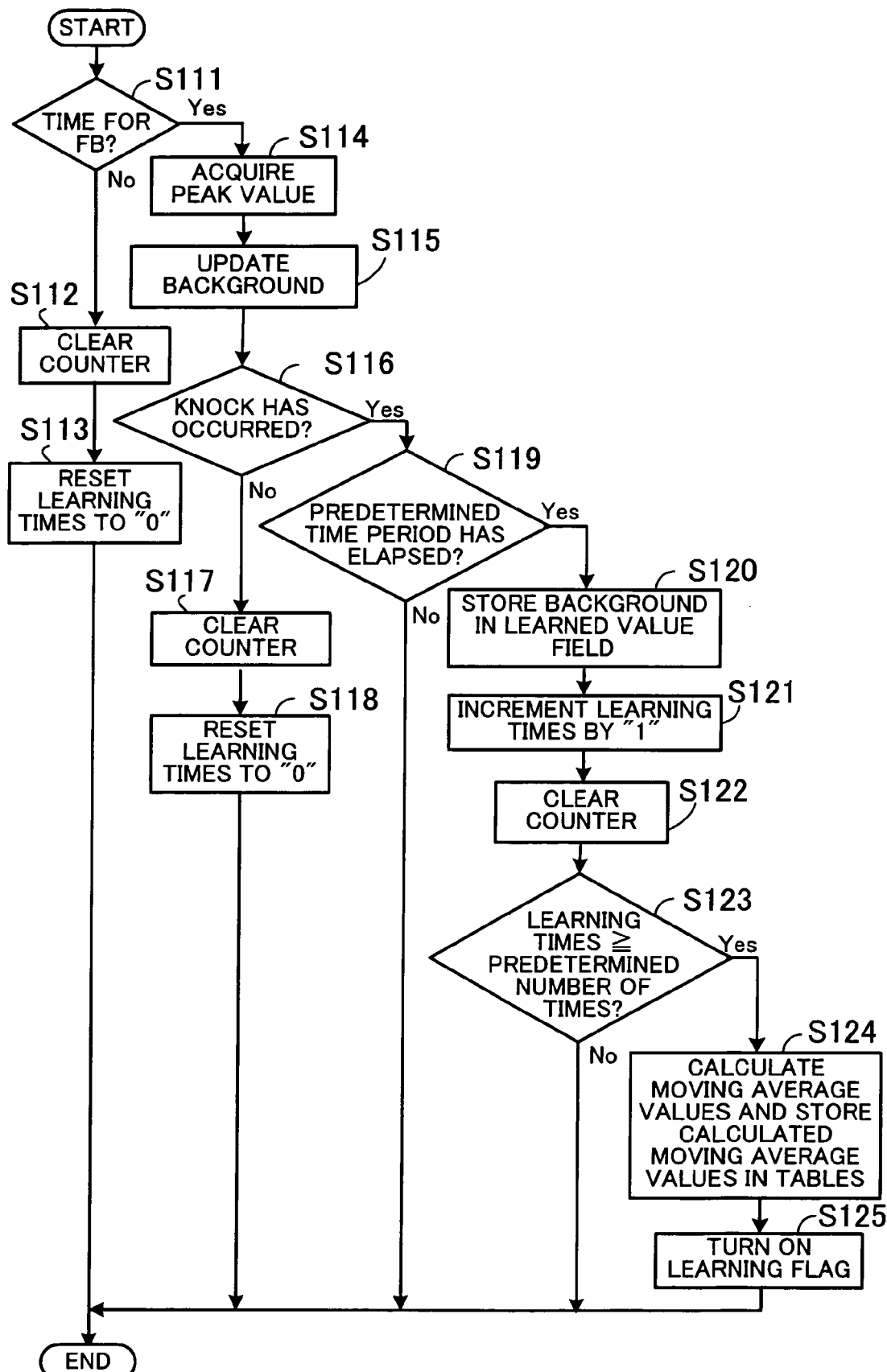
FIG. 30 is a flowchart showing a process for learning the background.

FIG. 30 is a flowchart showing the process for learning the background. The CPU 111 executed the process at predetermined time intervals, by following steps described below. It should be noted that a symbol "n" in the flowchart represents the number of engine cylinders, and each of steps with "n" is executed on a cylinder-by-cylinder basis.

In step S111, the CPU 111 determines whether or not it is during a period for executing knock feedback control (knock observation period). If it is during the period for executing knock feedback control, the process proceeds to step S114, whereas if not, the process proceeds to step S112.

In the step S112, the CPU 111 clears a counter for counting a timing for background acquisition. Then, in step S113, the CPU 111 resets a variable (the number n of learning times) for counting the number of sample backgrounds required for calculating a moving average value of the background to 0. In the steps S112 and S113, the counter and the number of learning times are cleared so as to perform the learning during a next knock observation period.

In the step S114, the CPU 111 acquires a peak value held in the peak hold amplifier 113. In step S115, the CPU 111 updates the background using the aforementioned equation (1).

In step S116, the CPU 111 compares a value calculated using the aforementioned equation (2) with the acquired peak value to thereby determine whether or not knock has occurred. If knock has occurred, the CPU 111 clears the counter in step S117. Then, in step S118, the CPU 111 resets the number of learning times to 0. In short, when knock occurs, the counter and the number of learning times are cleared in the steps S117 and S118, respectively, so as to inhibit calculation of the moving average value. If it is determined in the step S116 that knock has not occurred, the process proceeds to step S119.

In the step S119, the CPU 111 refers to the counter, and determines whether or not a predetermined time period has elapsed (i.e. whether the counter value has reaches a predetermined value). More specifically, it is determined whether or not it is time to acquire a sample background for use in calculating the moving average value. If it is not the time, the process is terminated, whereas if it is the time, the process proceeds to step S120.

In the step S120, the CPU 111 sequentially stores variables (learned values) for use in calculating the moving average value. The number of the variables (learned values) corresponds to the number of sample backgrounds required for calculating a moving average value thereof. In step S121, the CPU 111 increments the number of learning times by 1. In step S122, the CPU 111 clears the counter. Then, in step S123, the CPU 111 determines whether or not the number of learning times has become equal to or larger than a predetermined value. In other words, it is determined whether or not sample backgrounds of a number required for calculating a moving average value have been acquired. If sample backgrounds of the number required for calculating a moving average value have been acquired, the process proceeds to step S124, wherein the CPU 111 calculates the moving average value of the background using backgrounds stored in the respective learning tables. Then, the CPU 111 acquires current engine coolant temperature, engine oil temperature, and engine intake air temperature from the coolant temperature sensor 122, the oil temperature sensor 123, and the intake air temperature sensor 124, respectively, and stores the calculated backgrounds in sections associated with the respective acquired temperatures in the coolant temperature-based learning table 141, the oil temperature-based learning table 143, and the intake air temperature-based learning table 142. In the following step S125, the CPU 111 turns on the learning flag. Thus, when the engine is started next time, the answer to the question of the step S101 in FIG. 29 becomes affirmative (YES), and the process proceeds via the step S102 to the step S103, wherein the CPU 111 sets the immediately preceding BG shown by the equation (1) to one of the learned backgrounds.

If the CPU 111 determines in the step S123 that sample backgrounds of the number required for calculating a moving average value have not been acquired, the process is terminated. Then, the process shown in FIG. 30 is repeatedly executed at predetermined intervals during the knock observation period, and when sample backgrounds of the number required for calculating a moving average value have been acquired, the process proceeds to step S124, wherein the moving average value is calculated.

As described above, in the present embodiment, at the start of the engine, the immediately preceding background for use in calculating the current background is set to a background stored during the immediately preceding start of the engine, so that convergence of the background during the start of the engine can be enhanced.

Further, since convergence of the background during the start of the engine is enhanced, it is possible to quickly start knock determination, thereby expanding the knock control range.

Next, a description will be given of a seventh embodiment. The equation (1) described in the sixth embodiment can be provided with an update guard value so as to prevent the background from suddenly changing due to noise. More specifically, it is possible to prevent the background from being updated to a value not smaller than the update guard value. For example, assuming that the update guard value is set to 2, even if the background is calculated using the equation (1) such that it is changed by a value of 5, the background is updated only by 2 in actuality.

However, a peak value can be suddenly changed by a cause other than noise. For example, a change in engine speed or intake pipe pressure might cause a sudden change in the background. In this case, although quick convergence of the background to the peak value is desired, the update guard value retards the convergence. To eliminate this inconvenience, in the prior art, the update guard value is configured to be updated in accordance with a change in each of engine speed and intake pipe pressure, whereby convergence of the background is improved. The seventh embodiment is distinguished from the prior art in that the update guard value is configured to be updated in accordance with changes in the injection amount of fuel and the degree of opening of a throttle valve as well.

The configuration of a knock detection apparatus according to the seventh embodiment is substantially the same as that of the knock detection apparatus 110 shown in FIG. 22, except that a sensor for detecting a throttle opening degree, a sensor for detecting a fuel injection amount, and a sensor for detecting intake pipe pressure are connected to the input interface 114, and the CPU 111 has a timer terminal to which is connected a sensor for detecting engine speed. The sensor for detecting engine speed detects engine speed as a pulse signal, and the CPU 111 counts pulse intervals of the pulse signal to thereby calculate the engine speed. The other component elements of the knock detection apparatus are identical to those in FIG. 22, and therefore detailed description thereof is omitted.

Figure 31:
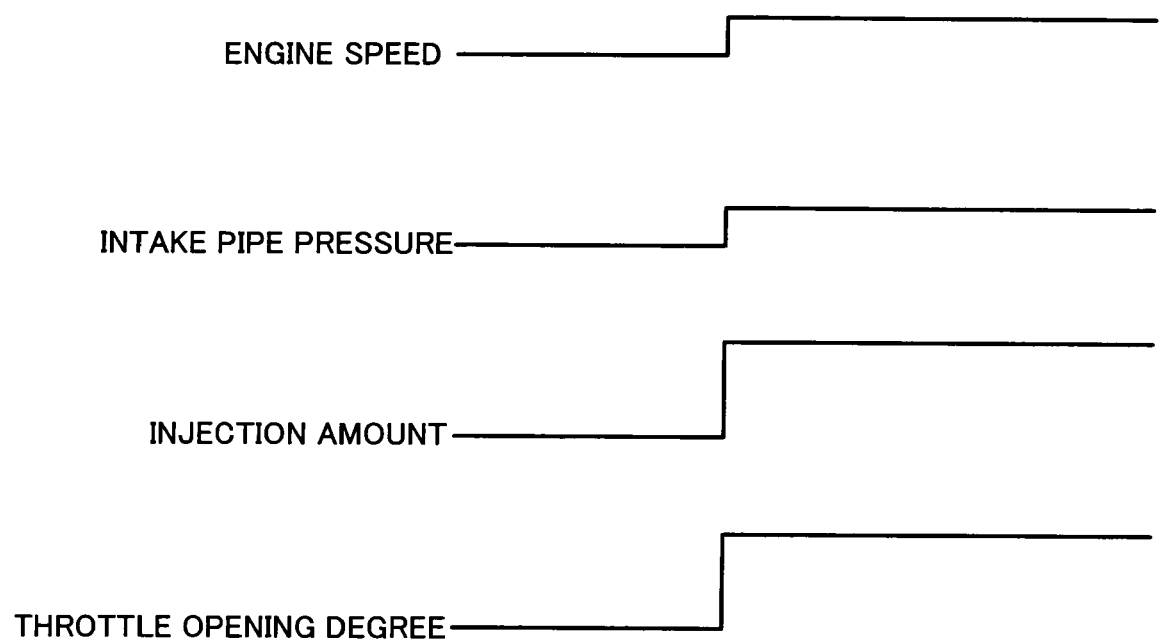
FIG. 31 is a diagram showing examples of respective changes in engine speed, intake pipe pressure, a fuel injection amount, and a throttle opening degree.

FIG. 31 is a diagram showing examples of respective changes in the engine speed, the intake pipe pressure, the fuel injection amount, and the throttle opening degree. For example, assuming that a vehicle ascends a slope from a flat road at a constant speed, load increases, which causes a change in the state of combustion to increase changes in the fuel injection amount and the throttle opening degree. On the other hand, changes in the intake pipe pressure and the engine speed are small because the vehicle is ascending the slope at the constant speed. Therefore, as shown in FIG. 31, changes in the fuel injection amount and the throttle opening degree are large, and changes in the engine speed and the intake pipe pressure are small.

In this case, in the prior art, since changes in the intake pipe pressure and the engine speed are small, even when the combustion state suddenly changes, the update guard value is not updated, and hence convergence of the background is slow. In the present embodiment, however, the update guard value is updated in accordance with a change in each of the fuel injection amount and the throttle opening degree as well, which improves convergence of the background. It should be noted that when changes in the fuel injection amount and the throttle opening degree are large, the update guard value is updated to a larger value.

Figure 32:
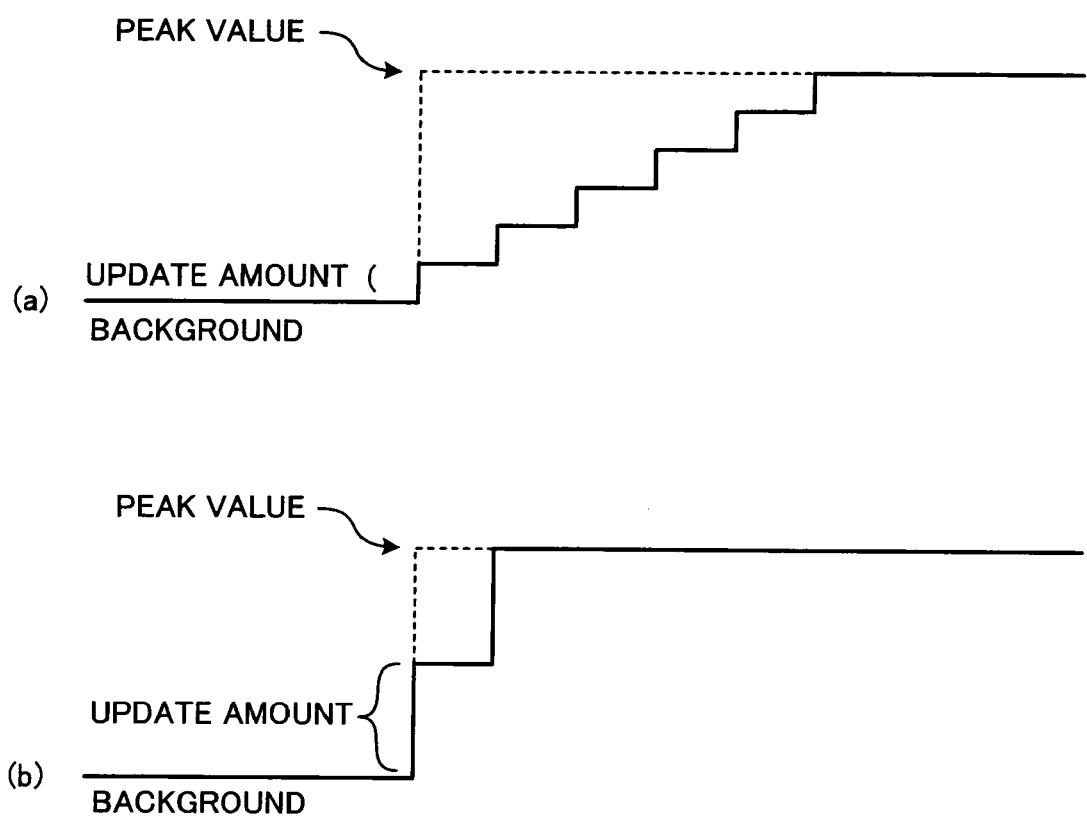
FIG. 32 is a diagram useful in explaining convergence of the background.

FIG. 32 is a diagram useful in explaining convergence of the background. FIG. 32(*a*) illustrates convergence of the background in the case where the update guard value is updated in accordance with a change in each of the intake pipe pressure and the engine speed, and FIG. 32(*b*) illustrates convergence of the background in the case where the update guard value is updated in accordance with a change in each of the intake pipe pressure, the engine speed, the fuel injection amount and the throttle opening degree.

For example, in the prior art, when the amounts of change in the engine speed and the intake pipe pressure are small, and those of the fuel injection amount and the throttle opening degree are large as shown in FIG. 31, even if a peak value has changed dramatically, the update guard value is not updated, and hence convergence of the background is slow as shown in FIG. 32(*a*). In the present embodiment, however, since the update guard value is configured to be updated according to the respective amounts of change in the fuel injection amount and the intake pipe pressure as well, the update guard value is updated even if changes in the engine speed and the intake pipe pressure are small, which makes it possible to enhance the convergence of the background. It should be noted that even when a peak value changes dramatically due to noise, if changes in the fuel injection amount and the intake pipe pressure are small, the update guard value is not updated, and therefore it is possible to suppress the response of the background to noise.

Next, the operation of the CPU 111 will be described using a flowchart.

Figure 33:
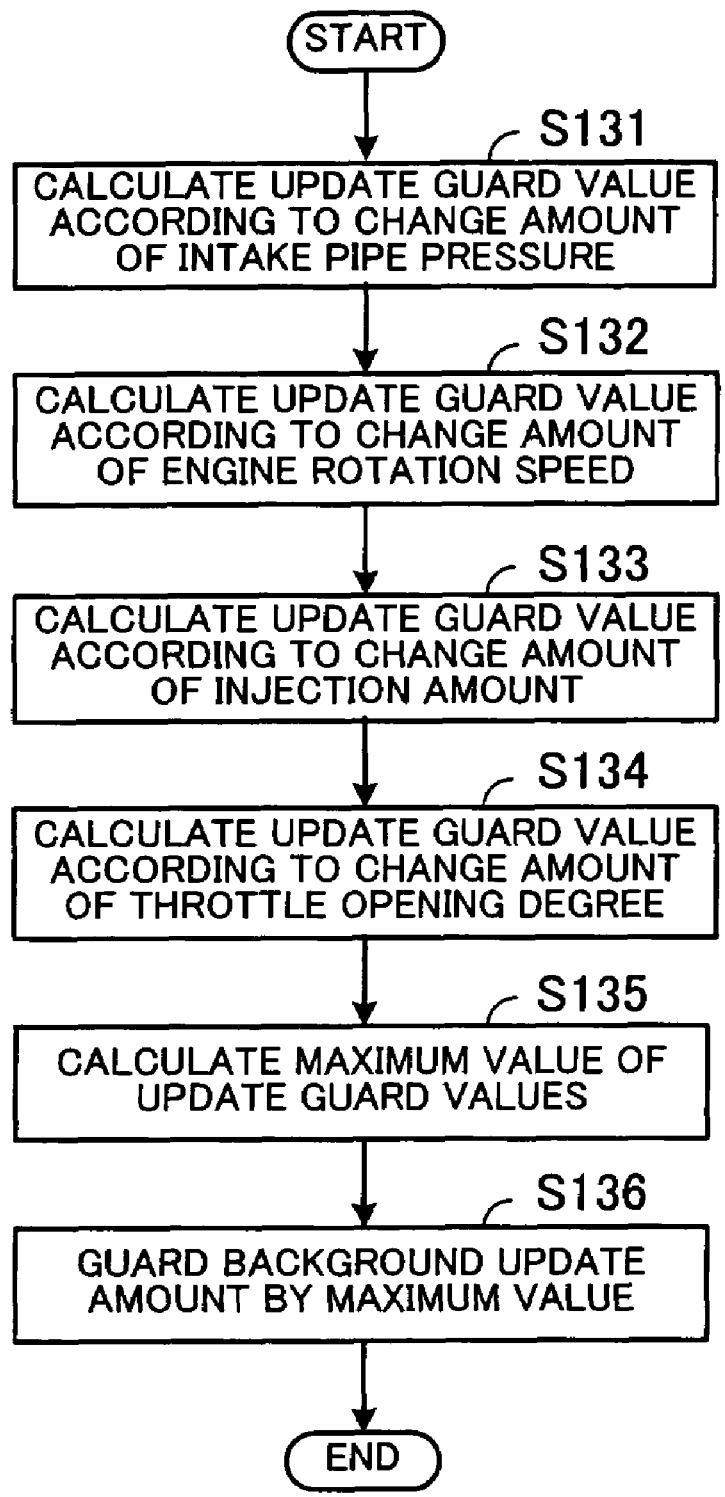
FIG. 33 is a flowchart showing a process for calculating an update guard value.

FIG. 33 is a flowchart showing a process for calculating an update guard value. The CPU 111 executes the process following steps described below.

In step S131, the CPU 111 acquires intake pipe pressure from the intake pipe pressure sensor. The CPU 111 calculates an update guard value according to the amount of change in the acquired intake pipe pressure. In step S132, the CPU 111 acquires engine speed from the engine speed sensor. The CPU 111 calculates an update guard value according to the amount of change in the acquired engine speed. In step S133, the CPU 111 acquires a fuel injection amount from the sensor for detecting a fuel injection amount. The CPU 111 calculates an update guard value according to the amount of change in the acquired fuel injection amount. In step S134, the CPU 111 acquires a throttle opening degree from the sensor for detecting a throttle opening degree. The CPU 111 calculates an update guard value according to the amount of change in the acquired throttle opening degree.

In step S135, the CPU 111 calculates the maximum value of the update guard values calculated in the steps S131 to S134, respectively.

In step S136, the CPU 111 guards the update amount of a background by the maximum update guard value calculated in the step S135. More specifically, when the update amount of the background is larger than the update guard value, the CPU 111 updates the background by only an amount corresponding to the update guard value.

As described above, since the update guard value for guarding the amount of change in the background is changed according to the fuel injection amount of the engine as well, it is possible to enhance the convergence of the background. Further, the update guard value for guarding the amount of change in the background is also changed according to the throttle opening degree of the engine, which contributes to enhancement of convergence of the background.

Furthermore, since convergence of the background is enhanced, it is possible to perform appropriate knock determination, thereby preventing erroneous retardation of the engine.

It should be noted that the above described sixth and seventh embodiments can be combined. For example, during the start of the engine, the immediately preceding background can be set to a background learned during the immediately preceding operation of the engine, according to the sixth embodiment, and after the start of the engine, the update guard value can be updated according to the seventh embodiment.

Further, during the start of the engine, the knock control starting time period can be changed according to any of the first to fifth embodiments, and after the start of the engine, the update guard value can be updated according to the seventh embodiment. Furthermore, during the start of the engine, it is possible to set the immediately preceding background to the background learned during the immediately preceding operation of the engine, according to the sixth embodiment, and change the knock control starting time period according to any of the first to fifth embodiments. In these cases, the knock control starting time period is determined considering cases where the immediately preceding background is set to the background learned during the immediately preceding operation of the engine.

According to the knock detection apparatus of the present invention, during the start of the engine, execution of knock determination based on a threshold value is inhibited until a predetermined time period calculated based on a temperature within the internal combustion engine has elapsed. This makes it possible to change the start time of knock determination so as to prevent erroneous knock determination, to thereby expand the knock control range.

Further, according to the knock detection apparatus of the present invention, during the start of the engine, the threshold value is set based on a threshold value learned or stored by threshold value learning/storing means, so that it is possible to enhance the convergence of the threshold value during the start of the engine.

Furthermore, since the upper limit value of the amount of change in the threshold value is changed according to the fuel injection amount of the engine as well, it is possible to enhance the convergence of the threshold value.

Moreover, since the upper limit value of the amount of change in the threshold value is changed according to the throttle opening degree of the engine as well, it is possible to enhance the convergence of the threshold value.

The foregoing is considered as illustrative only of the principles of the present invention. Further, since numerous modifications and changes will readily occur to those skilled in the art, it is not desired to limit the invention to the exact construction and applications shown and described, and accordingly, all suitable modifications and equivalents may be regarded as falling within the scope of the invention in the appended claims and their equivalents.

What is claimed is:

1. A knock detection apparatus for detecting knock in an internal combustion engine, comprising:
   threshold value calculation means for calculating a threshold value for knock determination, based on a plurality of knock signals from the engine;
   knock determination means for performing the knock determination based on the threshold value; and
   knock determination control means for inhibiting execution of the knock determination based on the threshold value until a predetermined time period determined according to a temperature of the engine has elapsed during a start of the engine.

2. The knock detection apparatus according to claim 1, wherein the predetermined time period is determined according to the temperature of the engine and a magnitude of the knock signal detected after starting the engine.

3. The knock detection apparatus according to claim 1, wherein the threshold value is calculated based on the knock signals detected during a predetermined cranking period after starting the engine, and
   the predetermined time period is determined according to the temperature of the engine and magnitudes of the knock signals detected during the predetermined cranking period after starting the engine.

4. The knock detection apparatus according to claim 1, further comprising time counting-starting means for starting counting of the predetermined time period after starting the engine is started and a starter signal is turned off.

5. The knock detection apparatus according to claim 1, wherein calculation of the threshold value is started after the engine is started and a starter signal is turned off.

6. The knock detection apparatus according to claim 1, wherein said knock determination control means does not use a result of the knock determination based on the threshold value in control of engine ignition timing until the predetermined time period has elapsed.

7. A knock detection apparatus for detecting knock in an internal combustion engine, comprising:
   threshold value calculation means for calculating a threshold value for knock determination, based on a plurality of knock signals from the engine;
   knock determination means for performing the knock determination based on the threshold value; and
   knock determination control means for inhibiting execution of the knock determination based on the threshold value until a predetermined time period determined according to a magnitude of the knock signal detected after starting the engine has elapsed, during a start of the engine.

8. A knock detection apparatus capable of calculating a threshold value for knock determination based on a detected knock signal from an internal combustion engine, comprising:
   threshold value calculation means for calculating a threshold value based on a plurality of knock signals;
   threshold value-learning/storing means for learning and storing a threshold value based on the threshold value calculated by said threshold value calculation means; and
   threshold value setting means for setting a threshold value during a start of the engine, based on the threshold value learned and stored by said threshold value-learning/storing means.

9. The knock detection apparatus according to claim 8, wherein said threshold value-learning/storing means learns and stores the threshold value based on the threshold value obtained as a moving average value calculated based on a plurality of threshold values.

10. The knock detection apparatus according to claim 8, wherein said threshold value-learning/storing means learns and stores a threshold value in association of each of predetermined temperatures of the engine.

11. The knock detection apparatus according to claim 8, wherein said threshold value-learning/storing means learns and stores a threshold value in association of each of cylinders of the engine.

12. The knock detection apparatus according to claim 8, wherein said threshold value-learning/storing means learns and stores a threshold value when a difference between the threshold value and a knock signal is within a predetermined range.

13. A knock detection apparatus capable of calculating a threshold value for knock determination based on a detected knock signal from an internal combustion engine, comprising:
    threshold value calculation means for calculating a new threshold value by updating an immediately preceding threshold value based on a plurality of knock signals;
    threshold value update-limiting means for setting an upper limit value for limiting an amount of update of the threshold value calculated by said threshold value calculation means; and
    upper limit value-updating means for changing the upper limit value according to a fuel injection amount in the engine.

14. The knock detection apparatus according to claim 13, wherein said upper limit value-updating means calculates the upper limit values also according to an engine speed and an intake pipe pressure, and adopts a maximum value of the upper limit values calculated according to the fuel injection amount, the engine speed, and the intake pipe pressure.

15. A knock detection apparatus capable of calculating a threshold value for knock determination based on a detected knock signal from an internal combustion engine, comprising:
    threshold value calculation means for calculating a new threshold value by updating an immediately preceding threshold value based on a plurality of knock signals;
    threshold value update-limiting means for setting an upper limit value for limiting an amount of update of the threshold value calculated by said threshold value calculation means; and
    upper limit value-updating means for changing the upper limit value according to a throttle opening degree of the engine.

16. The knock detection apparatus according to claim 15, wherein said upper limit value-updating means calculates the upper limit values also according to an engine speed and an intake pipe pressure, and adopts a maximum value of the upper limit values calculated according to the throttle opening degree, the engine speed, and the intake pipe pressure.

17. A knock detection apparatus for detecting knock in an internal combustion engine, comprising:
    an input interface receiving a signal responsive to a temperature of the engine;
    a CPU calculating a threshold value for knock determination based on a plurality of knock signals from the engine and performing the knock determination based on the threshold value; and
    an output interface outputting a result of the knock determination,
    wherein the knock determination is inhibited during a predetermined time period determined according to the temperature of the engine when the engine is started.

18. The knock detection apparatus according to claim 17, wherein the predetermined time period is determined according to the temperature of the engine and a magnitude of the knock signal detected after starting the engine.

19. The knock detection apparatus according to claim 17, wherein the threshold value is calculated based on the knock signals detected during a predetermined cranking period after starting the engine, and
    the predetermined time period is determined according to the temperature of the engine and magnitudes of the knock signals detected during the predetermined cranking period after starting the engine.

20. The knock detection apparatus according to claim 17, wherein a count of the predetermined time period is started when the engine is started and a starter signal is turned off.

21. The knock detection apparatus according to claim 17, wherein calculation of the threshold value is started after the engine is started and a starter signal is turned off.

22. A method of detecting knock in an internal combustion engine, comprising the steps of:
    calculating a threshold value for knock determination, based on a plurality of knock signals from the engine;
    performing the knock determination based on the threshold value; and
    inhibiting execution of the knock determination based on the threshold value during a predetermined time period determined according to the temperature of the engine when the engine is started.

23. The method according to claim 22, wherein the predetermined time period is determined according to the temperature of the engine and a magnitude of the knock signal detected after starting the engine.

24. The method according to claim 22, wherein the threshold value is calculated based on the knock signals detected during a predetermined cranking period after starting the engine, and
    the predetermined time period is determined according to the temperature of the engine and magnitudes of the knock signals detected during the predetermined cranking period after starting the engine.

25. The method according to claim 22, further comprising a time counting-starting step for starting counting of the predetermined time period after starting the engine is started and a starter signal is turned off.

26. The method according to claim 22, wherein calculation of the threshold value is started after the engine is started and a starter signal is turned off.

* * * * *